United States Patent
Degroot, Jr. et al.

(10) Patent No.: US 11,390,747 B2
(45) Date of Patent: Jul. 19, 2022

(54) LOW VISCOSITY COMPOSITIONS AND 3D PRINTING METHODS UTILIZING THE COMPOSITIONS

(71) Applicant: DOW SILICONES CORPORATION, Midland, MI (US)

(72) Inventors: Jon V. Degroot, Jr., Midland, MI (US); Eun Sil Jang, Midland, MI (US); Eric Joffre, Midland, MI (US); Bizhong Zhu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/272,108

(22) PCT Filed: Aug. 28, 2019

(86) PCT No.: PCT/US2019/048548
§ 371 (c)(1),
(2) Date: Feb. 26, 2021

(87) PCT Pub. No.: WO2020/051039
PCT Pub. Date: Mar. 12, 2020

(65) Prior Publication Data
US 2021/0317311 A1    Oct. 14, 2021

Related U.S. Application Data

(60) Provisional application No. 62/726,417, filed on Sep. 3, 2018.

(51) Int. Cl.
*C08L 83/04*    (2006.01)
*B33Y 10/00*    (2015.01)
(Continued)

(52) U.S. Cl.
CPC ............ *C08L 83/04* (2013.01); *B29C 64/112* (2017.08); *B33Y 10/00* (2014.12); *B33Y 70/00* (2014.12);
(Continued)

(58) Field of Classification Search
CPC ............... C08L 83/04; C08L 2205/025; C08L 2205/035; B33Y 10/00; B33Y 70/00;
(Continued)

(56) References Cited

U.S. PATENT DOCUMENTS 3,159,601 A    12/1964 Ashbu
3,220,972 A    11/1965 Lamoreaux
(Continued)

FOREIGN PATENT DOCUMENTS

CN    105637035 A    6/2016
WO    2014108364 A1    7/2014
(Continued)

OTHER PUBLICATIONS

International Search Report for PCT/US2019/048548 dated Oct. 30, 2019, 3 pages.
(Continued)

*Primary Examiner* — Larry W Thrower
(74) *Attorney, Agent, or Firm* — Warner Norcross + Judd LLP

(57) ABSTRACT

A composition for forming a silicone elastomer is disclosed. The composition comprises: A) a linear organopolysiloxane having at least two silicon-bonded ethylenically unsaturated groups per molecule; B) a linear organohydrogensiloxane having at least two silicon-bonded hydrogen atoms per molecule; C) at least one cross-linker; and D) a hydrosilylation catalyst. The cross-linker C) is selected from the group consisting of: C1) an organopolysiloxane having at least three silicon-bonded ethylenically unsaturated groups
(Continued)

per molecule; and C2) an organopolysiloxane having at least three silicon-bonded hydrogen atoms per molecule. At least one of the silicon-bonded ethylenically unsaturated groups of component C1) has a lower reactivity relative to the silicon-bonded ethylenically unsaturated groups of component A). Moreover, at least one of the silicon-bonded hydrogen atoms of component C2) has a lower reactivity relative to the silicon-bonded hydrogen atoms of component B). Methods of forming three-dimensional (3D) articles utilizing the compositions are also disclosed.

19 Claims, 14 Drawing Sheets

(51) Int. Cl.
  *B33Y 70/00* (2020.01)
  *B29C 64/112* (2017.01)
  *C09D 11/102* (2014.01)
  *C09D 11/30* (2014.01)
  *B29K 83/00* (2006.01)

(52) U.S. Cl.
  CPC ............ *C09D 11/102* (2013.01); *C09D 11/30* (2013.01); *B29K 2083/00* (2013.01); *C08L 2205/025* (2013.01); *C08L 2205/035* (2013.01)

(58) Field of Classification Search
  CPC ..... B29C 64/112; C09D 11/102; C09D 11/30; B29K 2083/00
  See application file for complete search history.

(56) References Cited

U.S. PATENT DOCUMENTS

| | | | |
|---|---|---|---|
| 3,296,291 A | 1/1967 | Chalk et al. | |
| 3,419,593 A | 12/1968 | Willing | |
| 3,516,946 A | 6/1970 | Modic | |
| 3,715,334 A | 2/1973 | Karstedt | |
| 3,814,730 A | 6/1974 | Karstedt | |
| 3,923,705 A | 12/1975 | Smith | |
| 3,928,629 A | 12/1975 | Chandra et al. | |
| 3,989,668 A | 11/1976 | Lee et al. | |
| 5,036,117 A | 7/1991 | Chung et al. | |
| 5,175,325 A | 12/1992 | Brown et al. | |
| 5,204,055 A | 4/1993 | Sachs et al. | |
| 5,387,380 A | 2/1995 | Cima et al. | |
| 6,200,581 B1 | 3/2001 | Lin et al. | |
| 6,605,734 B2 | 8/2003 | Roy et al. | |
| 9,145,474 B2 | 9/2015 | Arkles et al. | |
| 2016/0230005 A1 | 8/2016 | Mayumi et al. | |
| 2016/0319080 A1 | 11/2016 | Arkles et al. | |
| 2016/0369058 A1 | 12/2016 | Zhang et al. | |
| 2017/0029571 A1* | 2/2017 | Kusunoki | H01L 24/29 |
| 2018/0037013 A1* | 2/2018 | Endo | C09D 183/04 |
| 2018/0066115 A1 | 3/2018 | Achenbach et al. | |
| 2018/0208797 A1 | 7/2018 | Achenbach et al. | |
| 2018/0258229 A1 | 9/2018 | Achenbach et al. | |

FOREIGN PATENT DOCUMENTS

| | | |
|---|---|---|
| WO | 2015069454 A1 | 5/2015 |
| WO | 2016044547 A1 | 3/2016 |
| WO | 2016176109 A1 | 11/2016 |
| WO | 2017040874 A1 | 3/2017 |
| WO | 2017044735 A1 | 3/2017 |
| WO | 2017079502 A1 | 5/2017 |
| WO | 2017089496 A1 | 6/2017 |
| WO | 2017121733 A1 | 7/2017 |
| WO | 2017144461 A1 | 8/2017 |
| WO | 2018183803 A1 | 10/2018 |
| WO | 2018183806 A1 | 10/2018 |
| WO | 2019217848 A1 | 11/2019 |

OTHER PUBLICATIONS

Yang, H. et al., "High Viscosity Jetting System for 3D Reactive Inkjet Printing", Additive Manufacturing and 3D printing group, University of Nottingham, pp. 505-513.

"Standard Terminology for Additive Manufacturing Technologies", ASTM International, West Conshohocken, PA, Sep. 9, 2013, 3 pages.

Hart, John, "Additive Manufacturing", PowerPoint presentation, Dec. 2, 2013, 16 pages.

Nguyen, Khai D. et al., "Ultrafast Diffusion-controlled Thiol-ene based Crosslinking of Silicone Elastomers with Tailored Mechanical Properties for Biomedical Applications", Polymer Chemistry (2016), 7(33), pp. 5281-5293.

International Preliminary Report on Patentability for PCT/US2019/048548 dated Mar. 9, 2021, 7 pages.

* cited by examiner

LOW VISCOSITY COMPOSITIONS AND 3D PRINTING METHODS UTILIZING THE COMPOSITIONS

CROSS-REFERENCE TO RELATED APPLICATIONS

This application is the U.S. National Stage of International Application No. PCT/US2019/048548 filed on 28 Aug. 2019, which claims priority to and all advantages of U.S. Provisional Application No. 62/726,417 filed on 3 Sep. 2018, the content of which is incorporated herein by reference.

FIELD OF THE INVENTION

This disclosure relates to compositions for forming silicone elastomers, and in particular, to low viscosity compositions comprising a combination of telechelic polymers of different functionalities, to silicone elastomers formed from such compositions, to methods of making such compositions and silicone elastomers, and to 3D printing of such compositions to form 3D elastomeric articles. Initial viscosity of the composition is low, while still providing desirable cured elastomer properties, such as excellent elongation, modulus, extensibility, etc.

DESCRIPTION OF THE RELATED ART

Siloxane based elastomer systems are generally formulated from high molecular weight polymers when high elongation and toughness are required. Unfortunately, the uncured materials formulated for these properties typically suffer from high viscosities in the uncured state. Alternatively, elastomer compositions utilizing low molecular weight materials to minimize the viscosity in the uncured state suffer from limited elongation, high modulus, and limited extensibility.

3D printing or additive manufacturing (AM) is a process of making three-dimensional (3D) solid objects, typically from a digital file. The creation of a 3D printed object is achieved using additive processes rather than subtractive processes. In an additive process, an object is created by laying down successive layers of material until the entire object is created. Each of these layers can be seen as a thinly sliced horizontal cross-section of the eventual object.

Additive processes have been demonstrated with certain limited types of materials, such as organic thermoplastics (e.g. polylactic acid (PLA) or acrylonitrile butadiene styrene (ABS)), plaster, clay, room temperature vulcanization (RTV) materials, paper, or metal alloys. These materials are unsuitable in certain end applications based on physical or chemical limitations, cost, slow solidification (or cure) times, improper viscosity, etc.

In addition, in these types of printing processes, there has been an industrial wide problem in balancing printability of the compositions and the mechanical properties of the finally printed and cured articles. For example, printability may require that a silicone composition has low viscosity and reasonable surface tension; however, silicone compositions with low viscosity normally have low molecular weight and the cured products from them have poor mechanical properties. Therefore, the state of the art in the industry is a compromise in the middle, i.e. printable compositions exploring the highest limit of allowed viscosity range, while arriving at a final cured article of mechanical properties better than these cured from compositions with ideal low starting viscosity but still far short of those cured from high viscosity compositions. Utilizing the shear thinning behavior of some high viscosity compositions during the printing process has also been evaluated, which helps lessen, but does not eliminate, the rheology requirement constraint for successful printing.

In view of the foregoing, there remains an opportunity to provide improved compositions for forming silicone elastomers. There also remains an opportunity to provide improved silicone elastomers, and improved methods of forming and utilizing such compositions and elastomers.

SUMMARY OF THE INVENTION

This disclosure relates to a composition for forming a silicone elastomer (referred to herein as the "composition"). The composition comprises: A) a linear organopolysiloxane having at least two silicon-bonded ethylenically unsaturated groups per molecule; B) a linear organohydrogensiloxane having at least two silicon-bonded hydrogen atoms per molecule; C) at least one cross-linker; and D) a hydrosilylation catalyst.

The cross-linker C) is selected from the group consisting of: C1) an organopolysiloxane having at least three silicon-bonded ethylenically unsaturated groups per molecule; and C2) an organopolysiloxane having at least three silicon-bonded hydrogen atoms per molecule. As such, the composition can include component C1), component C2), or a combination of components C1) and C2).

At least one of the silicon-bonded ethylenically unsaturated groups of component C1) has a lower reactivity relative to the silicon-bonded ethylenically unsaturated groups of component A). For example, relative to a silicon-bonded vinyl group of component A), a silicon-bonded hexenyl group of component C1) generally is of lower (or slower) reactivity with the silicon-bonded hydrogen atoms of component B), in the context of the composition as a whole (where components A) and C1) are competing in the composition). It is to be appreciated that such relative reactivities may be different when components A) and C1) are not in competition.

At least one of the silicon-bonded hydrogen atoms of component C2) has a lower reactivity relative to the silicon-bonded hydrogen atoms of component B). For example, relative to a silicon-bonded hydrogen atom of component B), a silicon-bonded hydrogen atom of component C2) generally is of lower (or slower) reactivity with the silicon-bonded ethylenically unsaturated groups of component A), in the context of the composition as a whole (where components B) and C2) are competing in the composition).

It is thought that a similar situation arises if components C1) and C2) are both present in the composition. In other words, it is thought that components C1) and C2) may also compete during reaction. For example, if both of the cross-linkers C) are present, component C2) will generally more readily react with free silicon-bonded ethylenically unsaturated groups provided by component A) relative to component C1) reacting with free silicon-bonded hydrogen atoms provided by component B).

In general, if a molar excess of component B) is present relative to component A), then at least component C1) is present. Alternatively, if a molar excess of component A) is present relative to component B), then in general at least component C2) is present. The molar basis is generally based on the number of silicon-bonded ethylenically unsaturated groups and silicon-bonded hydrogen atoms provided by components A) and B), respectively.

It is to be appreciated that components A) and B) may also be present in an equimolar amount.

The hydrosilylation catalyst D) is present in a catalytically effective amount. Thus, the composition is generally classified as a hydrosilylation reaction composition, and the elastomer is cured via hydrosilylation reaction of at least components A), B), and C). In general, component D) promotes reaction of the aforementioned functional groups of components A), B), and C).

In addition, this disclosure relates to a silicone elastomer (referred to herein as the "elastomer"). As alluded to above, the elastomer comprises the reaction product of the composition. In various embodiments, the elastomer comprises the reaction product of components A), B), and C), formed in the presence of component D). The reaction product may also be formed in the presence of one or more optional additives. Such additives, if utilized, may be inert to, or reactive with, other components of the composition.

Moreover, this disclosure relates to methods of forming a three-dimensional (3D) article (embodiments thereof referred to herein as the "printing method" or "method"). In one embodiment, the method comprises: I) printing a first silicone composition with a 3D printer to form a layer; and II) printing a second silicone composition on the layer with the 3D printer to form a subsequent layer. Optionally, the method further comprises repeating step II) with independently selected silicone composition(s) for any additional layer(s) to form the 3D article. The first and second silicone compositions are the same as or different from one another. At least one of the silicone compositions is the composition.

In other embodiments, the method comprises: 1) I) curing a first layer in a volume of silicone composition; and II) curing a second layer in a volume of silicone composition; III) optionally, repeating step II) with independently selected silicone composition(s) for any additional layer(s) to form the 3D article; or 2) direct formation of a cured 3D article in a volume of liquid composition (e.g. by processes such as two photon polymerization); or 3) 1) direct deposition of a silicone composition into a supporting medium to form directly a 3D article; and II) curing the 3D article with or without application of heat, electromagnetic radiation, electric field and oscillation, and/or magnetic field and oscillation.

A 3D article formed by the printing method is also provided by this disclosure. The 3D article may also be referred to herein as the "3D silicone article" or "article."

BRIEF DESCRIPTION OF THE DRAWING(S)

DETAILED DESCRIPTION OF THE INVENTION

Figure 1:
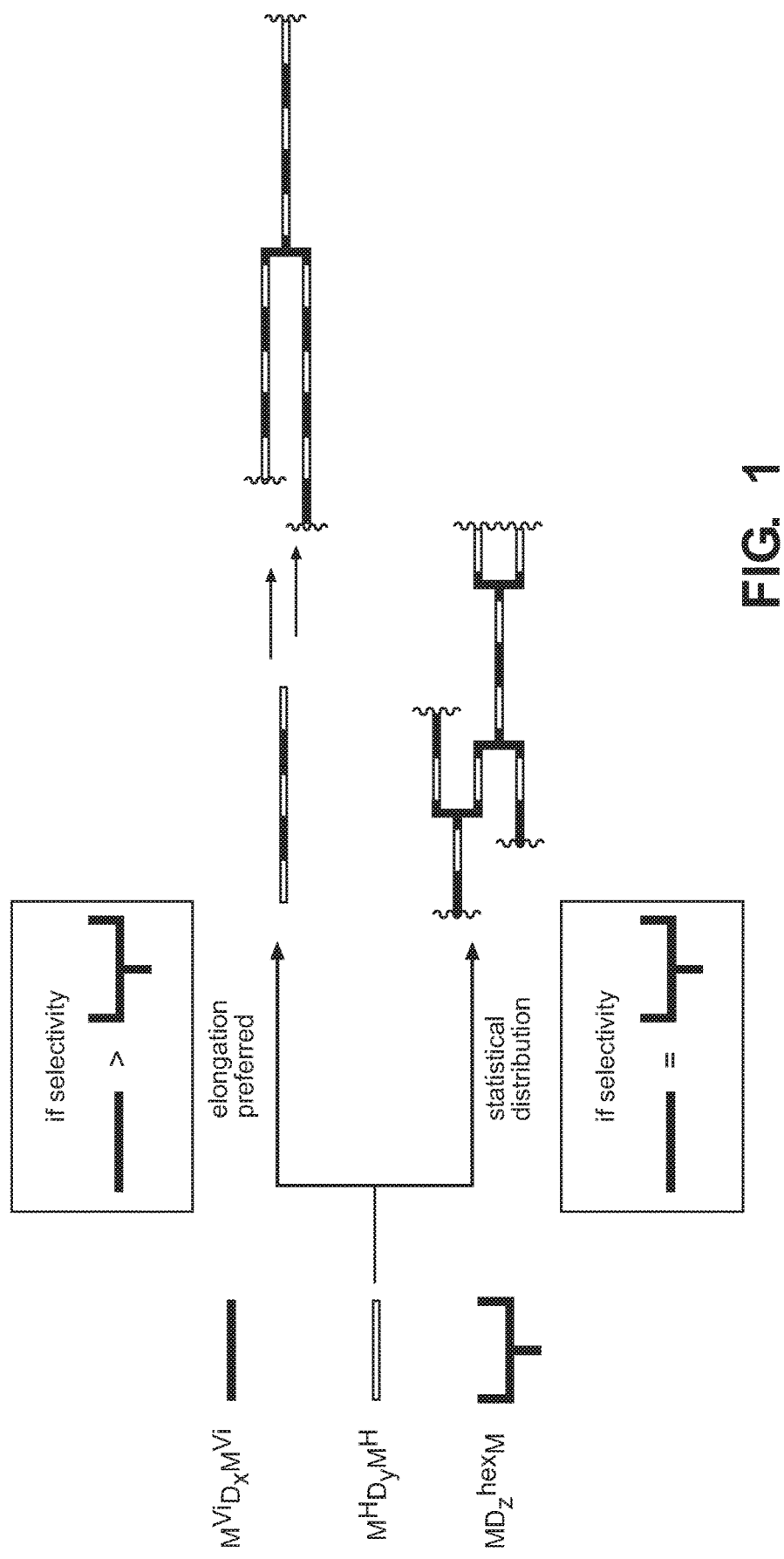
FIG. 1 illustrates a reaction scheme of possible network formations based on functional group selectivity.

As used herein, the term "ambient temperature" or "room temperature" refers to a temperature between about 20° C. and about 30° C. Usually, room temperature ranges from about 20° C. to about 25° C. The term "ambient pressure" or "atmospheric pressure" refers to a pressure of about 101 kPa.

All viscosity measurements referred to herein were measured at 25° C. unless otherwise indicated. Viscosity can be determined via methods understood in the art.

The following abbreviations have these meanings herein: "Me" means methyl, "Et" means ethyl, "Pr" means propyl, "Bu" means butyl, "g" means grams, and "ppm" means parts per million. In addition, "Vi" or "vi" means vinyl, and "Hex" or "hex" means hexenyl.

"Hydrocarbyl" means a monovalent hydrocarbon group which may be substituted or unsubstituted. Specific examples of hydrocarbyl groups include alkyl groups, alkenyl groups, alkynyl groups, aryl groups, aralkyl groups, etc.

"Alkyl" means an acyclic, branched or unbranched, saturated monovalent hydrocarbon group. Alkyl is exemplified by, but not limited to, Me, Et, Pr (e.g. iso-Pr and/or n-Pr), Bu (e.g. iso-Bu, n-Bu, tert-Bu, and/or sec-Bu), pentyl (e.g. iso-pentyl, neo-pentyl, and/or tert-pentyl), hexyl, heptyl, octyl, nonyl, decyl, undecyl, and dodecyl as well as branched saturated monovalent hydrocarbon groups of 6-12 carbon atoms. Alkyl groups may have 1-30, alternatively 1-24, alternatively 1-20, alternatively 1-12, alternatively 1-10, and alternatively 1-6, carbon atoms.

"Alkenyl" means an acyclic, branched or unbranched, monovalent hydrocarbon group having one or more carbon-carbon double bonds. Alkenyl is exemplified by, but not limited to, vinyl, allyl, methallyl, propenyl, and hexenyl. Alkenyl groups may have 2-30, alternatively 2-24, alternatively 2-20, alternatively 2-12, alternatively 2-10, and alternatively 2-6, carbon atoms.

"Alkynyl" means an acyclic, branched or unbranched, monovalent hydrocarbon group having one or more carbon-carbon triple bonds. Alkynyl is exemplified by, but not limited to, ethynyl, propynyl, and butynyl. Alkynyl groups may have 2-30, alternatively 2-24, alternatively 2-20, alternatively 2-12, alternatively 2-10, and alternatively 2-6, carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5-9, alternatively 6-7, and alternatively 5-6, carbon atoms. Polycyclic aryl groups may have 10-17, alternatively 10-14, and alternatively 12-14, carbon atoms.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

"Alkenylene" means an acyclic, branched or unbranched, divalent hydrocarbon group having one or more carbon-carbon double bonds. "Alkylene" means an acyclic, branched or unbranched, saturated divalent hydrocarbon group. "Alkynylene" means an acyclic, branched or unbranched, divalent hydrocarbon group having one or more carbon-carbon triple bonds. "Arylene" means a cyclic, fully unsaturated, divalent hydrocarbon group.

"Carbocycle" and "carbocyclic" each mean a hydrocarbon ring. Carbocycles may be monocyclic or alternatively may be fused, bridged, or spiro polycyclic rings. Monocyclic carbocycles may have 3-9, alternatively 4-7, and alternatively 5-6, carbon atoms. Polycyclic carbocycles may have 7-17, alternatively 7-14, and alternatively 9-10, carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl. "Cycloalkylene" means a divalent saturated carbocycle.

The term "substituted" as used in relation to another group, e.g. a hydrocarbyl group, means, unless indicated otherwise, one or more hydrogen atoms in the hydrocarbyl group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more. The term "branched" as used herein describes a polymer with more than two end groups.

M, D, T and Q units are generally represented as $R_u SiO_{(4-u)/2}$, where u is 3, 2, 1, and 0 for M, D, T, and Q, respectively, and R is an independently selected hydrocarbyl group. The M, D, T, Q designate one (Mono), two (Di), three (Tri), or four (Quad) oxygen atoms covalently bonded to a silicon atom that is linked into the rest of the molecular structure.

Component A)

Component A) includes at least two aliphatically unsaturated groups per molecule, which may alternatively be referred to as ethylenic unsaturation. The ethylenically unsaturated groups of component A) may be terminal, pendent, or in both locations in component A). The ethylenically unsaturated group may be an alkenyl group and/or an alkynyl group. Alkenyl groups are exemplified by, but not limited to, vinyl, allyl, propenyl, and hexenyl. Alkynyl is exemplified by, but not limited to, ethynyl, propynyl, and butynyl. In certain embodiments, the silicon-bonded ethylenically unsaturated groups of component A) are vinyl groups.

In various embodiments, component A) has two silicon-bonded ethylenically unsaturated groups per molecule. In further embodiments, the silicon-bonded ethylenically unsaturated groups of component A) are terminal groups. In yet further embodiments, the silicon-bonded ethylenically unsaturated groups of component A) are terminal vinyl groups.

Examples of simplified structures for embodiments of component A) include:

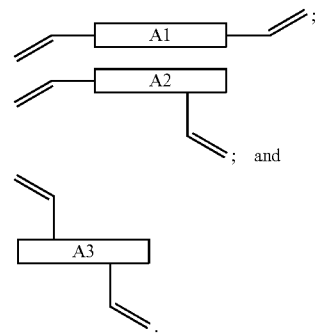

In certain embodiments, component A) is a mixture of two or more structures as illustrated above. In various embodiments, component A) is of average formula I):

$$R^1(R^2)_2SiO[(R^3R^4SiO)]_nSi(R^2)_2R^1 \qquad I);$$

which may also be illustrated as average formula I):

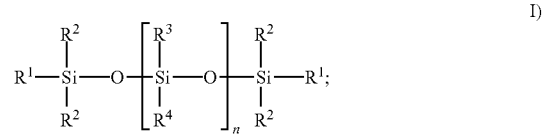

where each R is an ethylenically unsaturated group, each of $R^2$, $R^3$, and $R^4$ is an independently selected substituted or unsubstituted hydrocarbyl group, and subscript n is from 2 to 10,000. In further embodiments, each $R^1$ is a vinyl group.

In certain embodiments, such as when the composition is of lower viscosity (e.g. about 10 to about 100 mPa·s), subscript n ranges from 5 to 100, 10 to 90, 20 to 80, 30 to 70, 40 to 60, or 45 to 55, or is about 50. In other embodiments, such as when the composition is of higher viscosity (e.g. about 1 to about 100 Pa·s), subscript n ranges from 100 to 10,000, 100 to 5,000, 100 to 2,500, 100 to 1,000, 200 to 900, 300 to 800, 400 to 700, 450 to 650, 475 to 600, or 500 to 550, or about 500. In certain embodiments, component A) comprises a combination of different linear organopolysiloxanes of different chain lengths (e.g. designated by subscript n).

Component B)

The silicon-bonded hydrogen atoms of component B) may be terminal, pendent, or in both locations in component B). In various embodiments, component B) has two silicon-bonded hydrogen atoms per molecule. In further embodiments, the silicon-bonded hydrogen atoms of component B) are terminal groups.

Examples of simplified structures for embodiments of component B) include:

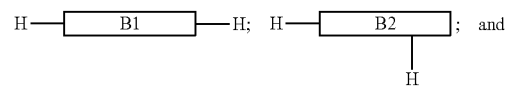

-continued

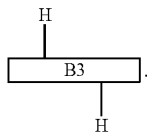

In certain embodiments, component B) is a mixture of two or more structures as illustrated above. In various embodiments, component B) is of average formula II):

$$H(R^2)_2SiO[(R^3R^4SiO)]_mSi(R^2)_2H \qquad \text{II)};$$

which may also be illustrated as average formula II):

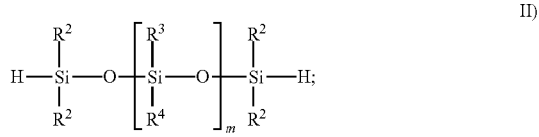

where each of $R^2$, $R^3$, and $R^4$ is an independently selected substituted or unsubstituted hydrocarbyl group, and subscript m is from 2 to 10,000.

In certain embodiments, such as when the composition is of lower viscosity (e.g. about 10 to about 100 mPa·s), subscript m ranges from 5 to 100, 10 to 90, 20 to 80, 30 to 70, 40 to 60, or 45 to 55, or is about 50. In other embodiments, such as when the composition is of higher viscosity (e.g. about 1 to about 100 Pa·s), subscript m ranges from 100 to 10,000, 100 to 5,000, 100 to 2,500, 100 to 1,000, 200 to 900, 300 to 800, 400 to 700, 450 to 650, 475 to 600, or 500 to 550, or about 500. In certain embodiments, component B) comprises a combination of different linear organohydrogen siloxanes of different chain lengths (e.g. designated by subscript m).

Component C)

In various embodiments, component C) may comprise any combination of M, D, T and/or Q siloxy units, so long as component C) includes at least three silicon-bonded groups that are reactive with the functional groups of component A) or B). These siloxy units can be combined in various manners to form cyclic, linear, branched and/or resinous (three-dimensional networked) structures. Component C) may be monomeric, polymeric, oligomeric, linear, branched, cyclic, and/or resinous depending on the selection of M, D, T, and/or Q units. In certain embodiments, component C) is substantially linear or linear.

In various embodiments, component C1) is present in the composition. The ethylenically unsaturated groups of component C1) may be terminal, pendent, or in both locations in component C1). The ethylenically unsaturated group may be an alkenyl group and/or an alkynyl group. Alkenyl groups are exemplified by, but not limited to, vinyl, allyl, propenyl, and hexenyl. Alkynyl is exemplified by, but not limited to, ethynyl, propynyl, and butynyl.

In various embodiments, component C1) has at least one hexenyl group, at least two hexenyl groups, or at least three hexenyl groups. In certain embodiments, the silicon-bonded ethylenically unsaturated groups of component C1) are hexenyl groups. In further embodiments, the silicon-bonded ethylenically unsaturated groups of component C1) are pendent groups. In yet further embodiments, the silicon-bonded ethylenically unsaturated groups of component C1) are pendent hexenyl groups.

Examples of simplified structures for embodiments of component C1) include:

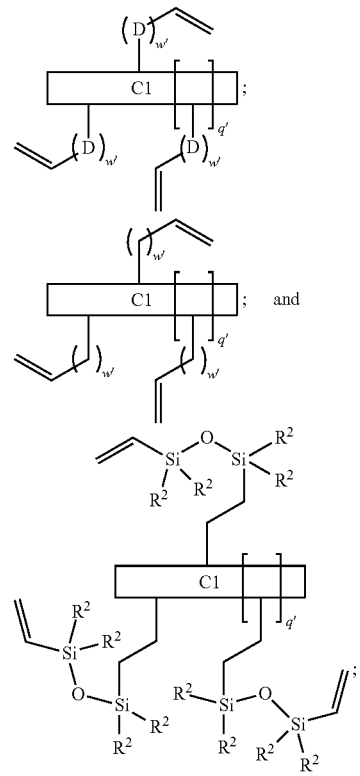

where subscript q' is ≥1; each subscript w' is independently 0 or ≥1; and each D is an independently selected divalent linking group. In general, a vinyl group is present when subscript w'=0; and a hexenyl group is present when subscript w'=4; however, it is to be appreciated that each subscript w' is independently 0 or ≥1 (including=1, 2, 3, 4, 5, etc.). In some embodiments, each D is —CH$_2$— or —CH$_2$CH$_2$Si(R$^2$)$_2$OSi(R$^2$)$_2$—. In certain embodiments, component C1) is a mixture of two or more structures as illustrated above.

In various embodiments, component C1) is of average formula III):

$$R^5(R^2)_2SiO[(R^3R^4SiO)]_p[(R^3R^6SiO)]_qSi(R^2)_2R^5 \qquad \text{III)};$$

which may also be illustrated as average formula III):

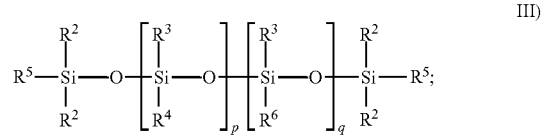

where each of $R^2$, $R^3$, and $R^4$ is an independently selected substituted or unsubstituted hydrocarbyl group, each $R^5$ is an independently selected ethylenically unsaturated group or is $R^2$, each $R^6$ is an independently selected moiety comprising an ethylenically unsaturated group, subscript p is from 1 to 500, and subscript q is from 1 to 500, provided that if each $R^5$ is $R^2$ then subscript q is from 3 to 500. In further embodiments, each $R^6$ is a hexenyl group.

In certain embodiments, subscript p ranges from 1 to 100, 2 to 50, 3 to 30, 4 to 25, 5 to 20, 6 to 17, 7 to 14, or 8 to 12, or about 10. In further or alternate embodiments, subscript q ranges from 1 to 100, 2 to 50, 3 to 30, 4 to 25, 5 to 20, 6 to 17, 7 to 14, or 8 to 12, or about 10.

In various embodiments, component C2) is present in the composition. The silicon-bonded hydrogen atoms of component C2) may be terminal, pendent, or in both locations in component C2). In further embodiments, the silicon-bonded hydrogen atoms of component C2) are pendent groups.

Examples of simplified structures for embodiments of component C2) include:

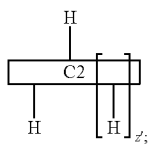

where subscript z' is ≥1. In certain embodiments, component C2) is a mixture of two or more structures as illustrated above.

In various embodiments, component C2) is of average formula IV):

which may also be illustrated as average formula IV):

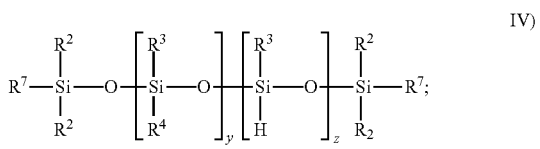

where each of $R^2$, $R^3$, and $R^4$ is an independently selected substituted or unsubstituted hydrocarbyl group, each $R^7$ is an independently selected hydrogen atom or is $R^2$, subscript y is from 1 to 500, and subscript z is from 1 to 500, provided that if each $R^7$ is $R^2$ then subscript z is from 3 to 500.

In certain embodiments, subscript y ranges from 1 to 100, 2 to 50, 3 to 30, 4 to 25, 5 to 20, 6 to 17, 7 to 14, or 8 to 12, or about 10. In further or alternate embodiments, subscript z ranges from 1 to 100, 2 to 50, 3 to 30, 4 to 25, 5 to 20, 6 to 17, 7 to 14, or 8 to 12, or about 10.

It is to be appreciated that the groups represented by subscripts p, q, y, and z, i.e., the groups having square brackets in formulas Ill) and IV) above, may be present in any order within the respective siloxane, including a different order than that which is represented above and throughout this disclosure. Moreover, these groups may be present in randomized or block form.

Component D)

The hydrosilylation (or addition) reaction, e.g. between Si—H and ethylenically unsaturated groups, takes place in the presence of the hydrosilylation catalyst (hereinafter the "catalyst"). The catalyst may be conventional to the art. For example, the catalyst may be a platinum group metal-containing catalyst. By "platinum group" it is meant ruthenium, rhodium, palladium, osmium, iridium and platinum and complexes thereof. Non-limiting examples of catalysts useful herein are described in U.S. Pat. Nos. 3,159,601; 3,220,972; 3,296,291; 3,419,593; 3,516,946; 3,715,334; 3,814,730; 3,923,705; 3,928,629; 3,989,668; 5,036,117; 5,175,325; and 6,605,734.

The catalyst can be platinum metal, platinum metal deposited on a carrier, such as silica gel or powdered charcoal, or a compound or complex of a platinum group metal. Typical catalysts include chloroplatinic acid, either in hexahydrate form or anhydrous form, and/or a platinum-containing catalyst which is obtained by a method comprising reacting chloroplatinic acid with an aliphatically unsaturated organosilicon compound, such as divinyl-tetramethyldisiloxane, or alkene-platinum-silyl complexes as described in U.S. Pat. No. 6,605,734. An example is: $(COD)Pt(SiMeCl_2)_2$ where "COD" is 1,5-cyclooctadiene. These alkene-platinum-silyl complexes may be prepared, e.g. by mixing 0.015 mole $(COD)PtCl_2$ with 0.045 mole COD and 0.0612 moles $HMeSiCl_2$.

One suitable platinum catalyst type is Karstedt's catalyst, which is described in Karstedt's U.S. Pat. Nos. 3,715,334 and 3,814,730. Karstedt's catalyst is a platinum divinyl tetramethyl disiloxane complex typically containing about 1 wt. % of platinum in a solvent, such as toluene. Another suitable platinum catalyst type is a reaction product of chloroplatinic acid and an organosilicon compound containing terminal aliphatic unsaturation (described in U.S. Pat. No. 3,419,593).

The catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

Specific examples of photoactivatable hydrosilylation catalysts include, but are not limited to: platinum(II) β-diketonate complexes, such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), and platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p-CN—C_6H_4NNNOC_6H_{11}]_4$, $Pt[p-H_3COC_6H_4NNNO-C_6H_{11}]_4$, $Pt[p-CH_3(CH_2)_x—C_6H_4NNNOCH_3]_4$, 1,5-cyclooctadiene.$Pt[p-CN—C_6H_4NNNOC_6H_{11}]_2$, 1,5-cyclooctadiene.$Pt[p-CH_3O—C_6H_4NNNOCH_3]_2$, $[(C_6H_5)_3P]_3Rh[p-CN—C_6H_4NNNOC_6H_{11}]$, and $Pd[p-CH_3(CH_2)_x—C_6H_4NNNOCH_3]2$, where x is 1, 3, 5, 11, or 17; (η-diolefin) (σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl)bis-($η^4$-dimethylaminophenyl) platinum, ($η^4$-1,5-cyclooctadienyl)bis-(4-acetylphenyl) platinum, and ($η^4$-1,5-cyclooctadienyl)bis-($η^4$-trifluoromethylphenyl)platinum. In various embodiments, the photoactivatable hydrosilylation catalyst is a Pt(II) β-diketonate complex, or Pt(II) bis(2,4-pentanedioate). The catalyst can be a single catalyst or a mixture comprising two or more different catalysts.

The catalyst is present in the composition in a catalytic amount, i.e., an amount or quantity sufficient to promote a reaction or curing thereof at desired conditions. Varying levels of the catalyst can be used to tailor reaction rate and cure kinetics. The catalytic amount of the catalyst may be greater than 0.01 ppm, and may be greater than 1,000 ppm (e.g., up to 10,000 ppm or more). In certain embodiments, the catalytic amount of catalyst is less than 5,000 ppm, alternatively less than 2,000 ppm, and alternatively less than 1,000 ppm (but in any case greater than 0 ppm). In specific embodiments, the catalytic amount of the catalyst may range from 0.01 to 1,000 ppm, alternatively 0.01 to 100 ppm, and alternatively 0.01 to 50 ppm, of metal based on the weight of the composition. The ranges may relate solely to the metal content within the catalyst or to the catalyst altogether (including its ligands). In certain embodiments, these ranges relate solely to the metal content within the catalyst. The catalyst may be added as a single species or as a mixture of two or more different species.

Optional Additive(s)

The composition may optionally further comprise additional ingredients or components (or "additives"), especially if the ingredient or component does not prevent the composition from curing. Examples of additional ingredients include, but are not limited to, carrier vehicles or solvents; stabilizers; colorants, including dyes and pigments; antioxidants; heat stabilizers; flame retardants; thixotropic agents; flow control additives; inhibitors; fillers, including extending and reinforcing fillers; and cross-linking agents.

In various embodiments, the composition further comprises at least additive selected from the group consisting of reaction inhibitors, terminating agents, fillers, thixotropic agents, organopolysiloxane resins, organopolysiloxanes different from component A), organohydrogensiloxanes different from component B), organopolysiloxanes different from component C), and combinations thereof. In these embodiments, the organopolysiloxanes different from component A), organohydrogensiloxanes different from component B), and organopolysiloxanes different from component C), may be referred to as a supplemental component S) (including components S1) and S2) described further below).

One or more of the additives can be present as any suitable weight percent (wt. %) of the composition, such as about 0.01 wt. % to about 65 wt. %, about 0.05 wt. % to about 35 wt. %, about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition. One of skill in the art can readily determine a suitable amount of additive depending, for example, on the type of additive and the desired outcome. Certain optional additives are described in greater detail below.

In various embodiments, the composition further comprises a terminating agent. Suitable terminating agents may have structures similar to components A), B), C), or S), but will have just one functional group reactive with other functional groups that react to form the elastomer. If utilized, the terminating agent is useful for creating dead-ends, or elastically ineffective junctions to change the modulus and tan delta of the resulting elastomer.

In various embodiments, the composition further comprises a reaction inhibitor. For example, an alkyne alcohol such as 2-methyl-3-butyn-2-ol, 3,5-dimethyl-1-hexyn-3-ol, or 2-phenyl-3-butyn-2-ol; an ene-yne compound such as 3-methyl-3-penten-1-yne or 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole may be incorporated as an optional component in the composition.

The content of the reaction inhibitor in the composition is not particularly limited. In certain embodiments, the content of the reaction inhibitor is from about 0.0001 to about 5 parts by mass per 100 parts total mass of components A), B), and C). One of skill in the art can readily determine the amount of a particular type of reaction inhibitor (or inhibitors) to make catalysis more latent.

The composition may include one or more fillers. The fillers may be one or more reinforcing fillers, non-reinforcing fillers, or mixtures thereof. Examples of finely divided, reinforcing fillers include high surface area fumed and precipitated silicas including rice hull ash and to a degree calcium carbonate. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, some fillers can be utilized to tune the thixotropic property of the composition.

The filler if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyi disilazane or short chain siloxane diols. Generally the surface treatment renders the filler(s) hydrophobic and therefore easier to handle and obtain a homogeneous mixture with the other components in the composition. Silanes such as $R^5_e$Si$(OR^6)_{4-e}$ where $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^6$ is an alkyl group of 1 to 6 carbon atoms, and subscript "e" is equal to 1, 2 or 3, may also be utilized as the treating agent for fillers.

In certain embodiments, the filler is a silica filler or a surface treated silica filler having functionality similar to components A), B), or C). If utilized, such fillers are useful for providing additional strengthening of the elastomer allowing for higher modulus and elongation at break, and may advantageously help tune the thixotropic property of the composition.

In various embodiments, the composition further comprises a thixotropic agent. Suitable thixotropic agents include rheological agents, specific examples of such agents may be found in U.S. Pub. Nos. 2018/0066115 A1 and 2018/0208797 A1.

Suitable carrier vehicles (or diluents) include silicones, both linear and cyclic, organic oils, organic solvents and mixtures of these. Specific examples of solvents may be found in U.S. Pat. No. 6,200,581.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm$^2$/sec, such as hexamethylcyclotrisiloxane, octamethylcyclotetrasiloxane, ecamethylcyclopentasiloxane, dodecamethylcyclohexasiloxane, octamethyltrisiloxane, decamethyltetrasiloxane, dodecamethylpentasiloxane, tetradecamethylhexasiloxane, exadeamethylheptasiloxane, heptamethyl-3-{(trimethylsilyl)oxy)}trisiloxane, hexamethyl-3,3, bis{(trimethylsilyl) oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Optional Component S1)

In various embodiments, the composition further comprises component S1). Component S1) is not limited and may be any unsaturated compound having at least two aliphatically unsaturated groups. In various embodiments, component S1) has at least three silicon-bonded ethylenically unsaturated groups per molecule. In certain embodiments, component S1) comprises a siloxane. In other embodiments, component S1) comprises a silicone-organic hybrid, or an organosilicon compound. Various embodiments and examples of component S1) are disclosed below.

The aliphatically unsaturated groups of component S1) may be terminal, pendent, or in both locations in component S1). For example, the aliphatically unsaturated group may be an alkenyl group and/or an alkynyl group. Alkenyl groups are exemplified by, but not limited to, vinyl, allyl, propenyl, and hexenyl. Alkynyl is exemplified by, but not limited to, ethynyl, propynyl, and butynyl.

In certain embodiments, component S1) comprises an organopolysiloxane of the following average formula:

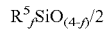

wherein each $R^5$ is an independently selected substituted or unsubstituted hydrocarbyl group with the proviso that in each molecule, at least two $R^5$ groups are aliphatically unsaturated groups, and wherein f is selected such that $0<f\leq3.2$.

The average formula above for the organopolysiloxane may be alternatively written as $(R^5{}_3SiO_{1/2})_w(R^5{}_2SiO_{2/2})_x(R^5SiO_{3/2})_y(SiO_{4/2})_z$, where $R^5$ and its proviso is defined above, and w, x, y, and z are independently from $\geq 0$ to $\leq 1$, with the proviso that $w+x+y+z=1$. One of skill in the art understands how such M, D, T, and Q units and their molar fractions influence subscript f in the average formula above. T and Q units, indicated by subscripts y and z, are typically present in silicone resins, whereas D units, indicated by subscript x, are typically present in silicone polymers (and may also be present in silicone resins).

Each $R^5$ is independently selected, as introduced above, and may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group. Examples of substituted and unsubstituted hydrocarbyl groups are introduced above relative to R. Examples of aliphatically unsaturated group(s) are also introduced above.

In certain embodiments, the organopolysiloxane is substantially linear, and alternatively is linear. In these embodiments, the substantially linear organopolysiloxane may have the average formula:

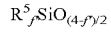

wherein each $R^5$ and its proviso are defined above, and wherein f is selected such that $1.9\leq f'\leq 2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000,000 mPa·s, alternatively from 100 to 1,000,000 mPa·s, and alternatively from 100 to 100,000 mPa·s, at 25° C. Viscosity may be measured at 25° C. via a Brookfield LV DV-E viscometer, as understood in the art.

In specific embodiments in which the organopolysiloxane is substantially linear or linear, the organopolysiloxane may have the average formula:

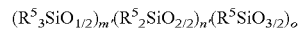

wherein each $R^5$ is independently selected and defined above (including the proviso that in each molecule, at least two $R^5$ groups are aliphatically unsaturated groups), and m'≥2, n'≥2, and o≥0. In specific embodiments, m' is from 2 to 10, alternatively from 2 to 8, alternatively from 2 to 6. In these or other embodiments, n' is from 2 to 1,000, alternatively from 2 to 500, alternatively from 2 to 200. In these or other embodiments, o is from 0 to 500, alternatively from 0 to 200, and alternatively from 0 to 100.

When the organopolysiloxane is substantially linear, and alternatively is linear, the silicon-bonded aliphatically unsaturated groups may be pendent, terminal or in both pendent and terminal locations. As a specific example of the organopolysiloxane having pendent silicon-bonded aliphatically unsaturated groups, the organopolysiloxane may have the average formula:

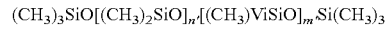

where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

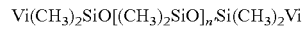

where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, component S1) may have the average formula:

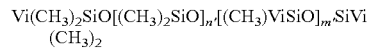

where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, component S1) may be a resinous organopolysiloxane. In these embodiments, the resinous organopolysiloxane may have the average formula:

$$R^5_{f''}SiO_{(4-f'')/2}$$

wherein each $R^5$ and its provisos are defined above, and wherein f'' is selected such that $0.5 \leq f'' \leq 1.7$.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). Typically, the resinous organopolysiloxane comprises T and/or Q units. A specific example of the resinous organopolysiloxane is a vinyl-terminated silsesquioxane.

The organopolysiloxane may comprise a combination or mixture of different organopolysiloxanes, including those of different structures. In certain embodiments, component S1) comprises one or more linear organopolysiloxanes as a majority component.

Optional Component S2)

In various embodiments, the composition further comprises component S2). Component S2) includes at least two silicon-bonded hydrogen atoms per molecule. In various embodiments, component S2) has at least three silicon-bonded hydrogen atoms per molecule. Component S2) can be linear, branched, cyclic, resinous, or have a combination of such structures. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, and alternatively from 3 to 4 silicon atoms.

In certain embodiments, component S2) is of formula $R^8_{4-s}SiH_s$, where $R^8$ is independently selected and may be any silicon-bonded group, and s is selected such that $1 \leq s \leq 4$. Typically, s is 1, 2, or 3, and alternatively 1 or 2. Each $R^8$ is typically independently a substituted or unsubstituted hydrocarbyl group. However, $R^8$ can be any silicon-bonded group so long as component S2) is still capable of undergoing hydrosilylation via its silicon-bonded hydrogen atoms. For example, $R^8$ can be a halogen. When component S2) is a silane compound, component S2) can be a monosilane, disilane, trisilane, or polysilane.

In these or other embodiments, component S2) may be an organosilicon compound of formula: $H_gR^9_{3-g}Si-R^{10}-SiR^9_2H$, wherein each $R^9$ is an independently selected substituted or unsubstituted hydrocarbyl group, g' is 0 or 1, and $R^{10}$ is a divalent linking group. $R^{10}$ may be a siloxane chain (including, for example, $-R^9_2SiO-$, $-R^9HSiO-$, and/or $-H_2SiO-D$ siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

In these or other embodiments, component S2) comprises an organohydrogensiloxane, which can be a disiloxane, trisiloxane, or polysiloxane. Examples of organohydrogensiloxanes suitable for use as component S2) include, but are not limited to, siloxanes having the following formulae: $PhSi(OSiMe_2H)_3$, $Si(OSiMe_2H)_4$, $MeSi(OSiMe_2H)_3$, and $Ph_2Si(OSiMe_2H)_2$, wherein Me is methyl, and Ph is phenyl. Additional examples of organohydrogensiloxanes that are suitable for purposes of component S2) include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), and a dimethylhydrogensiloxy-terminated poly(methylhydrogensiloxane).

When component S2) comprises an organohydrogensiloxane, component S2) may comprise any combination of M, D, T and/or Q siloxy units, so long as component S2) includes at least two silicon-bonded hydrogen atoms. These siloxy units can be combined in various manners to form cyclic, linear, branched and/or resinous (three-dimensional networked) structures. Component S2) may be monomeric, polymeric, oligomeric, linear, branched, cyclic, and/or resinous depending on the selection of M, D, T, and/or Q units.

Because component S2) includes at least two silicon-bonded hydrogen atoms, with reference to the siloxy units set forth above, component S2) may comprise any of the following siloxy units including silicon-bonded hydrogen atoms, optionally in combination with siloxy units which do not include any silicon-bonded hydrogen atoms: $(R^9_2HSiO_{1/2})$, $(R^9H_2SiO_{1/2})$, $(H_3SiO_{1/2})$, $(R^9HSiO_{2/2})$, $(H_2SiO_{2/2})$, and/or $(HSiO_{3/2})$, where $R^9$ is independently selected and defined above.

In specific embodiments, for example when component S2) is linear, component S2) may have the average formula:

$$(R^{11}_3SiO_{1/2})_{e''}(R^9_2SiO_{2/2})_{f'''}(R^9HSiO_{2/2})_{g''},$$

wherein each $R^{11}$ is independently hydrogen or $R^9$, each $R^9$ is independently selected and defined above, and $e'' \geq 2$, $f''' \geq 0$, and $g'' \geq 2$. In specific embodiments, e'' is from 2 to 10, alternatively from 2 to 8, and alternatively from 2 to 6. In these or other embodiments, f''' is from 0 to 1,000, alternatively from 1 to 500, and alternatively from 1 to 200. In these or other embodiments, g'' is from 2 to 500, alternatively from 2 to 200, and alternatively from 2 to 100.

In one embodiment, component S2) is linear and includes two or more pendent silicon-bonded hydrogen atoms. In these embodiments, component S2) may be a dimethyl, methyl-hydrogen polysiloxane having the average formula;

$$(CH_3)_3SiO[(CH_3)_2SiO]_{f'''}[(CH_3)HSiO]_{g''}Si(CH_3)_3$$

where f''' and g'' are defined above.

In these or other embodiments, component S2) is linear and includes terminal silicon-bonded hydrogen atoms. In these embodiments, component S2) may be an SiH terminal dimethyl polysiloxane having the average formula:

$$H(CH_3)_2SiO[(CH_3)_2SiO]_{f'''}Si(CH_3)_2H$$

where f''' is as defined above. The SiH terminal dimethyl polysiloxane may be utilized alone or in combination with the dimethyl, methyl-hydrogen polysiloxane disclosed immediately above. Further, the SiH terminal dimethyl polysiloxane may have one trimethylsiloxy terminal such that the SiH terminal dimethyl polysiloxane may have only one silicon-bonded hydrogen atom. Alternatively still, component S2) may include both pendent and terminal silicon-bonded hydrogen atoms.

In these embodiments, at a temperature of 25° C., the substantially linear organohydrogenpolysiloxane is typically a flowable liquid or is in the form of an uncured rubber. Generally, the substantially linear organohydrogenpolysiloxane has a viscosity of from 10 to 30,000,000 mPa·s, alternatively from 10 to 10,000,000 mPa·s, alternatively from 100 to 1,000,000 mPa·s, and alternatively from 100 to 100,000 mPa·s, at 25° C. Viscosity may be measured at 25° C. via a Brookfield LV DV-E viscometer, as understood in the art.

In certain embodiments, component S2) may have one of the following average formulas:

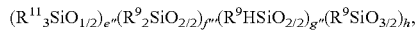

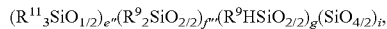

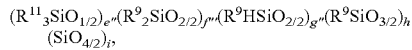

wherein each $R^{11}$ and $R^9$ is independently selected and defined above, e'', f''', and g'' are defined above, and h≥0, and i is ≥0.

Some of the average formulas above for component S2) are resinous when component S2) includes T siloxy units (indicated by subscript h) and/or Q siloxy units (indicated by subscript i). When component S2) is resinous, component S2) is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

In various embodiments in which component S2) is resinous, or comprises an organopolysiloxane resin, component S2) typically has the formula:

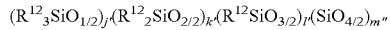

wherein each $R^{12}$ independently is H or a substituted or unsubstituted hydrocarbyl group, with the proviso that in one molecule, at least one $R^{12}$ is H; and wherein 0≤j'≤1; 0≤k'≤1; 0≤l'1; and 0≤m''≤1; with the proviso that j'+k'+l'+m''=1.

In certain embodiments, component S2) may comprise an alkylhydrogen cyclosiloxane or an alkylhydrogen dialkyl cyclosiloxane copolymer, represented in general by the formula $(R^{12}{}_2SiO)_r(R^{12}HSiO)_{s'}$, where $R^{12}$ is independently selected and defined above, and where r' is an integer from 0-7 and s' is an integer from 3-10. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl ($—CH_3$). Component S2) can be a single silicon hydride compound or a combination comprising two or more different silicon hydride compounds.

In various embodiments, the composition further comprises an organopolysiloxane resin ("resin"). Suitable resins are as described above. In certain embodiments, the resin is an MQ resin. The resin can be useful for providing an additional source of cross-link points for formation of the elastomeric network.

Method of Forming the Composition and Elastomer

This disclosure also relates to a method of forming the composition and elastomer. The composition can be formed by combining components A), B), C), and D), and optionally along with any other components (e.g. one or more additives). The components can be combined in any order of addition, optionally with a master batch, and optionally under shear. In general, the elastomer begins to form upon reaction of component C).

The composition may comprise each of components A), B), and C) in varying amounts or ratios contingent on desired properties of the composition and elastomers formed therefrom. In various embodiments, the composition comprises components A) and B) in an amount to provide a mole ratio of silicon-bonded hydrogen atoms to silicon-bonded ethylenically unsaturated groups of from 0.3 to 5, and alternatively from 0.6 to 3. In certain embodiments, on a molar basis 0.005 (A/B) 0.995. In further embodiments, 0.5<[(A+B)/C]<2.0.

The composition may be a single part or a multi-part composition. Certain compositions are highly reactive such that multi-part compositions prevent premature mixing and curing of the components. The multi-part composition may be, for example, a two-part system, a three-part system, etc. contingent on the selection of the composition and the components thereof. Any component of the composition may be separate from and individually controlled with respect to the remaining components. However, in many embodiments, the composition can be in the form of a single part composition.

In certain embodiments, the composition is shear thinning. Compositions with shear thinning properties may be referred to as pseudo-plastics. As understood in the art, compositions with shear thinning properties are characterized by having a viscosity which decreases upon an increased rate of shear strain. Said differently, viscosity and shear strain are inversely proportional for shear thinning compositions. When the compositions are shear thinning, the compositions are particularly well suited for printing, especially when a nozzle or other dispense mechanism is utilized, such as an ink-jet head.

When first formed, the composition can have a wide viscosity range. In various embodiments, the composition has a viscosity less than 100 Pa·s at 25° C., alternatively less than 100 mPa·s at 25° C., alternatively less than 40 mPa·s at 25° C., alternatively less than 20 mPa·s at 25° C., alternatively less than 15 mPa·s at 25° C., alternatively less than 10 mPa·s at 25° C., alternatively less than 100 Pa·s at a shear rate of $10^{-1}$ 1/s and less than 1 Pa·s at a shear rate of $≥10^3$ at 25° C., alternatively less than 100 Pa·s at a shear rate of $10^{-1}$ 1/s and less than 1 Pa·s at a shear rate of $≥10^3$ 1/s at 25° C., alternatively less than 100 Pa·s at a shear rate of $10^{-1}$ 1/s and less than 1 Pa·s at a shear rate of $≥10^3$ 1/s at ≥25° C., alternatively less than 100 Pa·s at a shear rate of $10^{-1}$ 1/s, and alternatively less than 100 mPa·s at a shear rate of $≥10^3$ 1/s at 25° C.

Viscosity can be determined via methods understood in the art. As readily understood in the art, kinematic viscosity may be measured in accordance with ASTM D-445 (2011), entitled "Standard Test Method for Kinematic Viscosity of Transparent and Opaque Liquids (and Calculation of Dynamic Viscosity)."

Viscosity of the composition can be changed by altering the amounts and/or molecular weight of one or more components thereof. Viscosity may be adjusted to match components of the 3D printer, particularly any nozzle or dispensing mechanism, to control heat, speed or other parameters associated with printing.

In certain embodiments, the composition is thixotropic. In general, a composition with thixotropic properties does not flow until a mechanical force is applied onto it to overcome the initial yield stress needed to cause flow. Such a behavior can be very beneficial for maintaining the printed 3D shape before curing reaction takes place.

Printing Method

The 3D article may be customized for myriad end use applications and industries. For example, the 3D article may be utilized in cushion and support applications. Alternatively or in addition, the 3D article may be utilized in construction applications. Further still, the 3D article may be utilized in biological and/or health care applications in view of the excellent compatibility between silicones and biological systems.

This disclosure generally incorporates by reference in its entirety ASTM Designation F2792-12a, "Standard Terminology for Additive Manufacturing Technologies." Under this ASTM standard, "3D printer" is defined as "a machine used for 3D printing" and "3D printing" is defined as "the fabrication of objects through the deposition of a material using a print head, nozzle, or another printer technology." "Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." AM may also be referred to as rapid prototyping (RP). As used herein, "3D printing" is generally interchangeable with "additive manufacturing" and vice versa.

The method of this disclosure can mimic any one of the aforementioned 3D printing processes, or other 3D printing processes understood in the art. Specific examples of suitable 3D printing processes are also described in U.S. Pat. Nos. 5,204,055 and 5,387,380.

3D printing is generally associated with a host of related technologies used to fabricate physical objects from computer generated data sources. Some of these specific processes are included above with reference to specific 3D printers. Further, some of these processes, and others, are described in greater detail below.

In general, 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however, other file formats can also or additionally be used. The file is generally read into 3D printing software, which takes the file and optionally user input to separate it into hundreds, thousands or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

The nozzle, printer head, and/or build platform generally moves in the X-Y (horizontal) plane before moving in the Z-axis (vertical) plane once each layer is complete. In this way, the object which becomes the 3D article is built one layer at a time from the bottom upwards. This process can use material for two different purposes, building the object and supporting overhangs in order to avoid extruding material into thin air.

In various embodiments, the method of this disclosure mimics a conventional material jetting process. Material jetting printers often resemble traditional paper printers, e.g. inkjet printers. In material jetting, a print head moves around a print area jetting the particular composition. Repeating this process builds up the object one layer at a time. Certain aspects of jetting systems are described in the paper entitled "HIGH VISCOSITY JETTING SYSTEM FOR 3D REACTIVE INKJET PRINTING" by H. Yang et al.; Additive Manufacturing and 3D printing group, University of Nottingham, NG7 2RD, UK, which is incorporated herein by reference.

The composition of this disclosure, prior to or during the early stages of cure is especially suited for inkjet printing based on its low viscosity relative to conventional compositions that may be of higher viscosity and thus are too thick to be printed using conventional ink-jetting printers and methodologies. As such, in certain embodiments, the 3D printer is an ink-jetting printer.

Optionally, the resulting objects may be subjected to different post-processing regimes, such as further heating, solidification, infiltration, bakeout, and/or firing. This may be done, for example, to expedite cure of the elastomer, to reinforce the 3D article, eliminate any curing/cured elastomer (e.g., by decomposition), to consolidate the core material (e.g., by sintering/melting), and/or to form a composite material blending the properties of powder and elastomer.

As introduced above, in certain embodiments, the method comprises the step of I) printing a first composition with a 3D printer to form a first layer from the first composition. Various types of 3D printers and/or 3D printing methodologies (i.e., "3D printing processes") can be utilized, as described in detail below. As also described below, various types of compositions can be utilized in the method, which may be the same as or different from one another and are independently selected. The first composition may be curable or otherwise capable of solidification upon application of a solidification condition, as described below in regards to suitable compositions for use in the method.

In other embodiments, the method can comprise: 1) I) curing a first layer in a volume of silicone composition; and II) curing a second layer in a volume of silicone composition; Ill) optionally, repeating step II) with independently selected silicone composition(s) for any additional layer(s) to form the 3D article; or 2) direct formation of a cured 3D article in a volume of liquid composition by processes such as two photon polymerization; or 3) 1) direct deposition of a silicone composition into a supporting medium to form directly a 3D article; and II) curing the 3D article with or without application of heat, electromagnetic radiation, electric field and oscillation, and/or magnetic field and oscillation. Combinations of these steps may also be used in further embodiments.

In various embodiments, the method of this disclosure mimics a conventional material extrusion process. Material extrusion generally works by extruding material (in this case, the first composition) through a nozzle to print one cross-section of an object, which may be repeated for each subsequent layer. The nozzle may be heated, cooled or otherwise manipulated during printing, which may aid in dispensing and/or controlling cure of the particular composition.

Given its generally low initial viscosity, the composition of this disclosure may be allowed to thicken or body a bit (via reaction/cure) to facilitate printing with conventional extrusion printers and methodologies. One of skill in the art can readily determine an optimal viscosity range of the composition for a particular type of printer or printing methodology. A surprising benefit of the composition is its low initial viscosity, which provides are a larger number of printing options in this regard. In various embodiments, the composition can also be tuned with fillers and/or other thixotropic agents so that the low initial viscosity advantage is combined with shear thinning behavior and/or thixotropy to arrive at an optimum formulation, e.g. for a particular 3D printing method.

The first composition is generally printed on a substrate such that the first layer is formed on the substrate. The substrate is not limited and may be any substrate. The substrate typically can support the 3D article during its method of forming. However, the substrate may itself be supported, e.g. by a table, such that the substrate itself need not have rigidity. The substrate may be rigid or flexible, and may be discontinuous or continuous in at least one of thickness and composition. The substrate may include a coating or other film disposed thereon, and the substrate may be removable, e.g. peelable, from the 3D article. Alternatively, the 3D article may physically and/or chemically bond to the substrate such that the 3D article and the substrate are integral together. In certain embodiments, the substrate may comprise a silicone substrate, e.g. an already cured silicone, such that the substrate becomes integral with the 3D article. The substrate may be a mold or any other object or article. However, depending on a selection of the first composition, the substrate is optional. For example, the first layer may have sufficient viscosity or rigidity such that the first layer is formed suspended in situ as the first composition is dispensed from the 3D printer, in which case the first layer is separate from and not in contact with any substrate.

Ambient conditions may be manipulated or controlled during printing. For example, if desired, the substrate may be heated, cooled, mechanically vibrated, or otherwise manipulated before, during, and/or after the steps of printing to assist with solidification and/or curing. Further, the substrate could be moved, e.g. rotated, during any printing step. Similarly, the dispenser may be heated or cooled before, during, and after dispensing the first composition. More than one dispenser may be utilized with each dispenser having independently selected properties or parameters. The method may be carried out in a heated environment such that curing initiates and/or accelerates after each step of printing.

The first layer formed by printing the first composition may have any shape and dimension. For example, the first layer need not be continuous, as in a conventional layer. The first layer need not have a consistent thickness. Depending on a desired shape of the 3D article formed by the method, the first layer may take any form.

For example, the first layer may comprise a film, which may be continuous or discontinuous in its dimensions, including thickness.

Alternatively or in addition, the first layer may comprise a first filament, and alternatively a plurality of filaments. The first filament, or plurality of filaments, of the first layer is referred to herein merely as the first filament for purposes of clarity, which extends to and encompasses a single filament or a plurality of filaments, which may be independently selected and formed in the first layer. The first filament may be randomized, patterned, linear, non-linear, woven, non-woven, continuous, discontinuous, or may have any other form or combinations of forms. For example, the first filament may be a mat, a web, or have other orientations. The first filament may be patterned such that the first layer comprises the first filament in a nonintersecting manner. For example, the first filament may comprise a plurality of linear and parallel filaments or strands. Alternatively, the first filament may intersect itself such that the first layer itself comprises a patterned or cross-hatched filament. The pattern or cross-hatching of the first filament may present perpendicular angles, or acute/obtuse angles, or combinations thereof, at each intersecting point of the first filament, which orientation may be independently selected at each intersecting point. In certain embodiments, the first filament may fuse with itself to define a void, and alternatively a plurality of voids, in the first layer.

Alternatively or in addition, the first layer may comprise fused droplets formed from the first composition. The fused droplets may be independently sized and selected and may have any desired deposition pattern, e.g. the fused droplets may contact one another, may be spaced from one another, may be at least partially overlapping, etc. Another form of the first layer formed from the first composition includes fused powders. The fused powders may be independently sized and selected and may have any desired deposition pattern.

The method further comprises II) printing a second composition on the first layer with the 3D printer to form a second layer from the second composition on the first layer. The second layer may only contact a portion of an exposed surface of the first layer. For example, depending on the desired shape of the 3D article, the second layer may build on the first layer selectively.

The second composition may be the same as or different from the first composition utilized to form the first layer. At least one of the first and second compositions comprises the composition of this disclosure. Any description above relative to I) printing the first composition to form the first layer is also applicable to II) printing the second composition on the first layer to form the second layer, and each aspect of each printing step is independently selected.

As introduced above and described in greater detail below, the method may optionally comprise repeating step II) with independently selected composition(s) for any additional layer(s). The first layer, second layer (or subsequent or latter layer), and any additional layer(s), optionally included as described below, are referred to collectively herein as "the layers." "The layers," as used herein in plural form, may relate to the layers at any stage of the method, e.g. in an unsolidified and/or uncured state, in a partially solidified and/or partially cured state, in a solidified or a final cure state, etc. Generally, any description below relative to a particular layer is also applicable to any other layer, as the layers are independently formed and selected.

Optionally, the method further comprises IV) exposing the layers to a solidification condition. The solidification condition may be any condition which contributes to solidification of the layers. For example, solidification may be a result of curing or increasing a cross-link density of the layers. Alternatively, solidification may be the result of a physical change within a layer, e.g. drying or removing any vehicle which may be present in any of the composition(s) and/or corresponding layer(s). Because each layer is independently selected, the solidification condition may vary for each layer.

Depending on a selection of the particular composition, the solidification condition may be selected from: (i) exposure to moisture; (ii) exposure to heat; (iii) exposure to irradiation; (iv) reduced ambient temperature; (v) exposure to solvent; (vi) exposure to mechanical vibration; or (vii) any combination of (i) to (vi). The solidification condition typically at least partially solidifies, and alternatively solidifies, the layers. In certain embodiments, the solidification condition comprises exposure to heat. Heating is useful for facilitating cure of the composition of this disclosure.

The layers may be exposed to the solidification condition at any time in the method, and exposure to the solidification condition need not be delayed until two or more layers are formed in the method. For example, they layers may be exposed to the solidification individually and/or collectively. Specifically, the first layer may be exposed to the solidification condition to at least partially solidify the first layer prior to forming the second layer thereon. In these embodiments, exposing the first layer to the solidification condition forms an at least partially solidified first layer such that II) is further defined as II) printing the second composition on the at least partially solidified first layer. Similarly, the second layer may be at least partially solidified prior to repeating any printing steps for additional layers. The layers may also be subjected or exposed to a solidification condition when in contact with one another, even if these layers were at least partially solidified iteratively prior to each printing step.

At least partial solidification of the layer is generally indicative of cure; however, cure may be indicated in other ways, and solidification may be unrelated to curing. For example, curing may be indicated by a viscosity increase, e.g. bodying of the layer, an increased temperature of the layer, a transparency/opacity change of the layer, an increased surface or bulk hardness, etc. Generally, physical and/or chemical properties of the layer are modified as each layer at least partially solidifies to provide the at least partially solidified layers, respectively.

In certain embodiments, "at least partially solidified" means that the particular at least partially solidified layer substantially retains its shape upon exposure to ambient conditions. Ambient conditions refer to at least temperature, pressure, relative humidity, and any other condition that may impact a shape or dimension of the at least partially solidified layer. For example, ambient temperature is room temperature. Ambient conditions are distinguished from solidification conditions, where heat (or elevated temperature) is applied. By "substantially retains its shape," it is meant that a majority of the at least partially solidified layer retains its shape, e.g. the at least partially solidified layer does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the at least partially solidified layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially solidified layer upon exposure to ambient conditions. The shape of the at least partially solidified layer may also impact whether the at least partially solidified layer substantially retains its shape. For example, when the at least partially solidified layer is rectangular or has another simplistic shape, the at least partially solidified layer may be more resistant to deformation at even lesser levels of solidification than at least partially solidified layers having more complex shapes.

More specifically, prior to exposing one or more layers to the solidification condition, the first composition (as well as the second composition and any subsequent compositions) is generally flowable and may be in the form of a liquid, slurry, or gel, alternatively a liquid or slurry, and alternatively a liquid. Viscosity of each composition can be independently adjusted depending on the type of 3D printer and its dispensing technique or other considerations. Adjusting viscosity can be achieved, for example, by heating or cooling any of the compositions, adjusting molecular weight of one or more components thereof, by adding or removing a solvent, carrier, and/or diluent, by adding a filler or thixotropic agent, by delaying or promoting reaction/cure, etc.

In certain embodiments when the first layer is at least partially solidified prior to printing the second composition, printing of the second composition to form the second layer occurs before the at least partially solidified first layer has reached a final solidified state, i.e., while the at least partially solidified first layer is still "green." As used herein, "green" encompasses a partial solidified and/or a partial cure but not a final solidified and/or cure state. The distinction between partial solidification and/or cure state and a final solidification and/or cure state is whether the partially solidified and/or cured layer can undergo further solidification, curing and/or cross-linking. Functional groups of the components of the first composition may be present even in the final solidified and/or cure state, but may remain unreacted due to steric hindrance or other factors.

In these embodiments, printing of the layers may be considered "wet-on-wet" such that the adjacent layers at least physically bond, and may also chemically bond, to one another. For example, in certain embodiments, depending on a selection of the compositions, components in each of the layers may chemically cross-link/cure across the print line. There may be certain advantages in having the cross-link network extend across the print line in relation to longevity, durability and appearance of the 3D article. The layers may also be formed around one or more substructures that can provide support or another function of the 3D article. In other embodiments, the compositions are not curable such that the layers are merely physically bonded to one another in the 3D article.

When the layers are applied wet-on-wet, and/or when the layers are only partially solidified and/or partially cured, any iterative steps of exposing the layers to a curing and/or solidification condition may effect cure of more than just the previously printed layer. As noted above, because the cure may extend beyond or across the print line, and because a composite including the layers is typically subjected to the solidification condition, any other partially cured and/or solidified layers may also further, and alternatively fully, cure and/or solidify upon a subsequent step of exposing the layers to a curing and/or solidification condition. By way of example, the method may comprise printing the second composition to form the second layer on the at least partially solidified first layer. Prior to printing another composition to form another layer on the second layer, the second layer may be exposed to a solidification condition such that printing another composition to form another layer on the second layer comprises printing another composition to form another layer on an at least partially solidified second layer. However, in such an embodiment, exposing the second layer to the solidification condition may, depending on the selection of the first and second compositions, also further cure and/or solidify the at least partially solidified first layer. The same is true for any additional or subsequent layers The layers can each be of various dimension, including thickness and width. Thickness and/or width tolerances of the layers may depend on the 3D printing process used, with certain printing processes having high resolutions and others having low resolutions. Thicknesses of the layers can be uniform or may vary, and average thicknesses of the layers can be the same or different. Average thickness is generally associated with thickness of the layer immediately after printing. In various embodiments, the layers independently have an average thickness of from about 1 to about 10,000, about 2 to about 1,000, about 5 to about 750, about 10 to about 500, about 25 to about 250, or about 50 to 100, μm. Thinner and thicker thicknesses are also contemplated. This disclosure is not limited to any particular dimensions of any of the layers.

Alternatively or in addition, as introduced above, the layers, or any one layer, may have a configuration other than a traditional layer or film. For example, in certain embodiments, the first layer comprises a first filament and the second layer comprises a second filament, or only one of the first and second layers comprises a filament. Each of the first and second filaments may comprise a single filament or a plurality of filaments. The first and second filaments are referred to herein as the first filament and the second filament, respectively, which extends to and encompasses each of the first and second non-linear filaments independently comprising a single filament or a plurality of filaments, which may be independently selected and formed. Each of the first and second filaments may independently be randomized, linear, non-linear, patterned, woven, non-woven, continuous, discontinuous, or may have any other form or combinations of forms. For example, each of the first and second filaments may independently be a mat, a web, or have other orientations. Each of the first and second filaments independently may be patterned, for example in a nonintersecting manner or via parallel filaments or strands spaced from one another. Alternatively, the first and/or second filaments may intersect with themselves or with one another. The pattern or cross-hatching of the first and/or second filament may present perpendicular angles, or acute/obtuse angles, or combinations thereof, at each intersecting point of the first filament with itself or with the second filament, which orientation may be independently selected at each intersecting point. In certain embodiments, the first layer or the first filament comprises a first non-linear filament and the second layer or the second layer comprises a second non-linear filament. The first and second non-linear filaments may be randomized. In other embodiments, the first and second non-linear filaments are the same as and continuous with one another. For example, in this embodiment, the 3D article may comprise a single filament or strand, which may be patterned or randomized. In these embodiments, the first and second layers are not separate or discrete from one another.

Further still, and as introduced above, the first layer may comprise fused droplets formed from the first composition. In these or other embodiments, the second layer may comprise fused droplets formed from the second composition.

In addition, and as introduced above, the first layer may comprise fused powders formed from the first composition. In these or other embodiments, the second layer may comprise fused powders formed from the second composition.

Regardless of the form of the layers, e.g. whether the layers are films, filaments, fused droplets, fused powders, combinations thereof, or other forms, each of the layers may have a randomized and/or a selectively solidified pattern. The randomized and/or selectively solidified patterns may take any form and may define the plurality of voids in the 3D article. Examples of selectively solidified patterns associated with filaments are set forth above with respect to the first layer. The fused droplets may contact one another, may be spaced from one another, may be at least partially overlapping, etc., in such selectively solidified patterns. Similarly, the fused powders may be independently sized and selected. The layers may also vary, such that the first layer comprises the first filament and the second layer comprises fused powders, etc. Moreover, a single layer, e.g. the first layer, may comprise a combination of different forms, for example may comprise both the first filament and fused droplets, which may be in contact with or spaced from one another.

If desired, inserts, which may have varying shape, dimension, and may comprise any suitable material, may be disposed or placed on or at least partially in any layer during the method. For example, an insert may be utilized in between subsequent printing steps, and the insert may become integral with the 3D article upon its formation. Alternatively, the insert may be removed at any step during the method, e.g. to leave a cavity or for other functional or aesthetic purposes. The use of such inserts may provide better aesthetics and economics over relying on printing alone.

Further, if desired, a composite including all or some of the layers may be subjected to a final solidification step, which may be a final cure step. For example, to ensure that the 3D article is at a desired solidification state, a composite formed by printing and at least partially solidifying the layers may be subjected to a further step of solidification or further steps of solidification where layers may solidify under different types of solidification conditions. The final solidification step, if desired, may be the same as or different from any prior solidification steps, e.g. iterative solidification steps associated with each or any layer.

The total number of layers required will depend, for example, on the size and shape of the 3D article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the 3D article is in a final solidified or cured state, the individual layers may not be identifiable.

In other embodiments, the layers can be formed in a volume of resin by curing of each individual layer induced by the application of one or more triggers, such as UV light, without the need to physically dispense the layer. Alternatively, the 3D articles can be formed directly in a volume of silicone composition, or deposited directly into a volume of support materials to form directly the net 3D shape, without the need to print one layer at a time.

In various embodiments, the 3D printer is selected from a fused filament fabrication printer, a fused deposition modeling printer, a direct ink deposition printer, a selective laser sintering printer, a selective laser melting printer, a stereo-lithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer. In certain embodiments where viscosity of the composition is relatively low, the 3D printer is of the type that benefits from lower viscosity compositions, such as ink-jet printers.

The 3D printer may be independently selected during each printing step associated with the method. Said differently, if desired, each printing step may utilize a different 3D printer. Different 3D printers may be utilized to impart different characteristics with respect to the layers, and different 3D printers may be particularly well suited for different types of compositions.

The first and second compositions, and any subsequent or additional compositions utilized to print subsequent or additional layers, are independently selected and may be the same as or different from one another. As such, for purposes of clarity, reference herein to "the composition" or "the compositions" is applicable to the first and/or second compositions, and any subsequent or additional compositions utilize to print subsequent or additional layers, and is not to be construed as requiring the compositions to be the same as one another.

In certain embodiments, each of the silicone compositions utilized in the method cures via the same cure mechanism upon application of the curing condition. These embodiments easily allow for cure across the print line, if desired, as the components of in each of the silicone compositions may readily react with one another in view of having the same cure mechanism upon application of the curing condition. In these embodiments, each of the silicone compositions may still differ from one another in terms of the actual components utilized and relative amounts thereof, even though the cure mechanism is the same in each of the silicone compositions. In contrast, although there may be some cure across the print line when each of the layers cures via a different mechanism (e.g. hydrosilylation versus condensation), components in these layers may not be able to react with one another upon application of the curing condition, which may be desirable in other applications.

As introduced above, at least one of the silicone compositions comprises the composition of this disclosure, i.e., is a hydrosilylation-curable silicone composition. Solidification conditions for such hydrosilylation-curable silicone compositions may vary. For example, hydrosilylation-curable silicone composition may be solidified or cured upon exposure to irradiation and/or heat. One of skill in the art understands how selection of the hydrosilylation catalyst D) impacts techniques for solidification and curing. In particular, photoactivatable hydrosilylation catalysts are typically utilized when curing via irradiation is desired.

When the solidification condition comprises heating, exposure to the solidification condition typically comprises heating the layer(s) at an elevated temperature for a period of time. The elevated temperature and the period of time may vary based on numerous factors, including the selection of the particular composition, a desired cross-link density of the at least partially solidified layer, dimensions of the layer(s), etc. In certain embodiments, the elevated temperature is from above room temperature to 300, alternatively from 30 to 250, alternatively from 40 to 200, and alternatively from 50 to 150° C. In these or other embodiments, the period of time is from 0.001 to 600, alternatively from 0.04 to 60, alternatively from 0.1 to 10, alternatively from 0.1 to 5, and alternatively from 0.2 to 2, minutes.

Any source of heat may be utilized for exposing the layer(s) to heat. For example, the source of heat may be a convection oven, rapid thermal processing, a hot bath, a hot plate, or radiant heat. Further, if desired, a heat mask or other similar device may be utilized for selective curing of the layer(s), as introduced above.

In certain embodiments, heating is selected from (i) conductive heating via a substrate on which the layer is printed; (ii) heating the composition via the 3D printer or a component thereof; (iii) infrared heating; (iv) radio frequency or micro-wave heating; (v) a heating bath with a heat transfer fluid; (vi) heating from an exothermic reaction of the composition; (vii) magnetic heating; (viii) oscillating electric field heating; and (ix) combinations thereof. When the method includes more than one heating step, e.g. in connection with each individual layer, each heating step is independently selected.

Such heating techniques are understood in the art. For example, the heat transfer fluid is generally an inert fluid, e.g. water, which may surround and contact the layer as the composition is printed, thus initiating at least partial curing thereof. With respect to (ii) heating the composition via the 3D printer or a component thereof, any portion of the composition may be heated and combined with the remaining portion, or the composition may be heated in its entirety. For example, a portion (e.g. one component) of the composition may be heated, and, once combined with the remaining portion, the composition initiates curing. The combination of the heated portion and remaining portion may be before, during, and/or after the step of printing the composition. The components may be separately printed.

Alternatively or in addition, the solidification condition may be exposure to irradiation. The energy source independently utilized for the irradiation may emit various wavelengths across the electromagnetic spectrum. In various embodiments, the energy source emits at least one of ultraviolet (UV) radiation, infrared (IR) radiation, visible light, X-rays, gamma rays, or electron beams (e-beam). One or more energy sources may be utilized.

In certain embodiments, the energy source emits at least UV radiation. In physics, UV radiation is traditionally divided into four regions: near (400-300 nm), middle (300-200 nm), far (200-100 nm), and extreme (below 100 nm). In biology, three conventional divisions have been observed for UV radiation: near (400-315 nm); actinic (315-200 nm); and vacuum (less than 200 nm). In specific embodiments, the energy source emits UV radiation, and alternatively actinic radiation. The terms of UVA, UVB, and UVC are also common in industry to describe the different wavelength ranges of UV radiation.

In certain embodiments, the radiation utilized to cure the layer(s) may have wavelengths outside of the UV range. For example, visible light having a wavelength of from 400 nm to 800 nm can be used. As another example, IR radiation having a wavelength beyond 800 nm can be used.

In other embodiments, e-beam can be utilized to cure the layer(s). In these embodiments, the accelerating voltage can be from about 0.1 to about 10 MeV, the vacuum can be from about 10 to about $10^{-3}$ Pa, the electron current can be from about 0.0001 to about 1 ampere, and the power can vary from about 0.1 watt to about 1 kilowatt. The dose is typically from about 100 micro-coulomb/$cm^2$ to about 100 coulomb/$cm^2$, and alternatively from about 1 to about 10 coulombs/$cm^2$. Depending on the voltage, the time of exposure is typically from about 10 seconds to 1 hour; however, shorter or longer exposure times may also be utilized.

INDUSTRIAL APPLICABILITY

This disclosure provides uncured materials having desirable lower viscosities for improved processability, while maintaining desirable high elongation, toughness, and lower modulus properties after curing. Specifically, this disclosure solves an existing problem by utilizing compositions comprising mixtures of siloxane with different unsaturated carbon species that can be reacted via Pt catalyzed hydrosilylation reactions. This solution utilizes the differential reactivity of the different unsaturated species to promote chain extension of the low molecular weight siloxane (e.g. via components A) and B)), during the early stages of the reaction to grow the molecular weight before significant cross-linking the system (e.g. via component C)) to an elastomer. An advantage of this solution is that it results in an elastomer network similar to one formed from the higher molecular weight polymer in terms of final properties, while maintaining an initial low viscosity in the uncured state. Alternatively, this disclosure can be viewed as a general technique to control the network structure of elastomers to manipulate the mechanical properties using a single reaction mechanism.

Moreover, the selectively chain extended hydrosilylation cure silicones of this disclosure, utilize low molecular starting materials to keep the viscosity down, and take advantage of one preferential reaction to extend the chain length during cure before a second reaction occurs to cross-link the material. Such an approach successfully combines the features needed for jetting based 3D printing: low starting viscosity and high mechanical properties after cure.

The following examples, illustrating the compositions and components of the compositions, elastomers, and methods, are intended to illustrate and not to limit the invention.

EXAMPLES

Example elastomer systems were designed and tested. The results established that preferential reactivity enables chain extension of vinyl functional components followed by effective cross-linking through the use of hexenyl functional components. Thus, it is feasible to formulate elastomer systems with lower molecular weight precursors (hence significantly lower viscosity) while maintaining elongation, strength and toughness similar to traditional formulations containing higher molecular weight polymers. In the examples illustrated herein, the viscosity of the uncured system was reduced by more than two (2) orders of magnitude while the cured products exhibited similar modulus and elongation.

Differential reactivity of hexenyl and vinyl silyl functional groups was used to construct silicone elastomers with high % elongation and break stress. Terminal vinyl ($M^{vi}D_nM^{vi}$) and terminal silyl hydride ($M^HD_mM^H$) linear polymers were used to extend the linear polymer chain via copolymerization and branched hexenyl functional polymers ($MD_xD^{hexenyl}_yM$; where y>2) to cross-link the copolymers. While viscosity of this new formulation is significantly lower than a typical silicone elastomer formulation, resulting materials exhibit comparable mechanical strengths.

Figure 2:
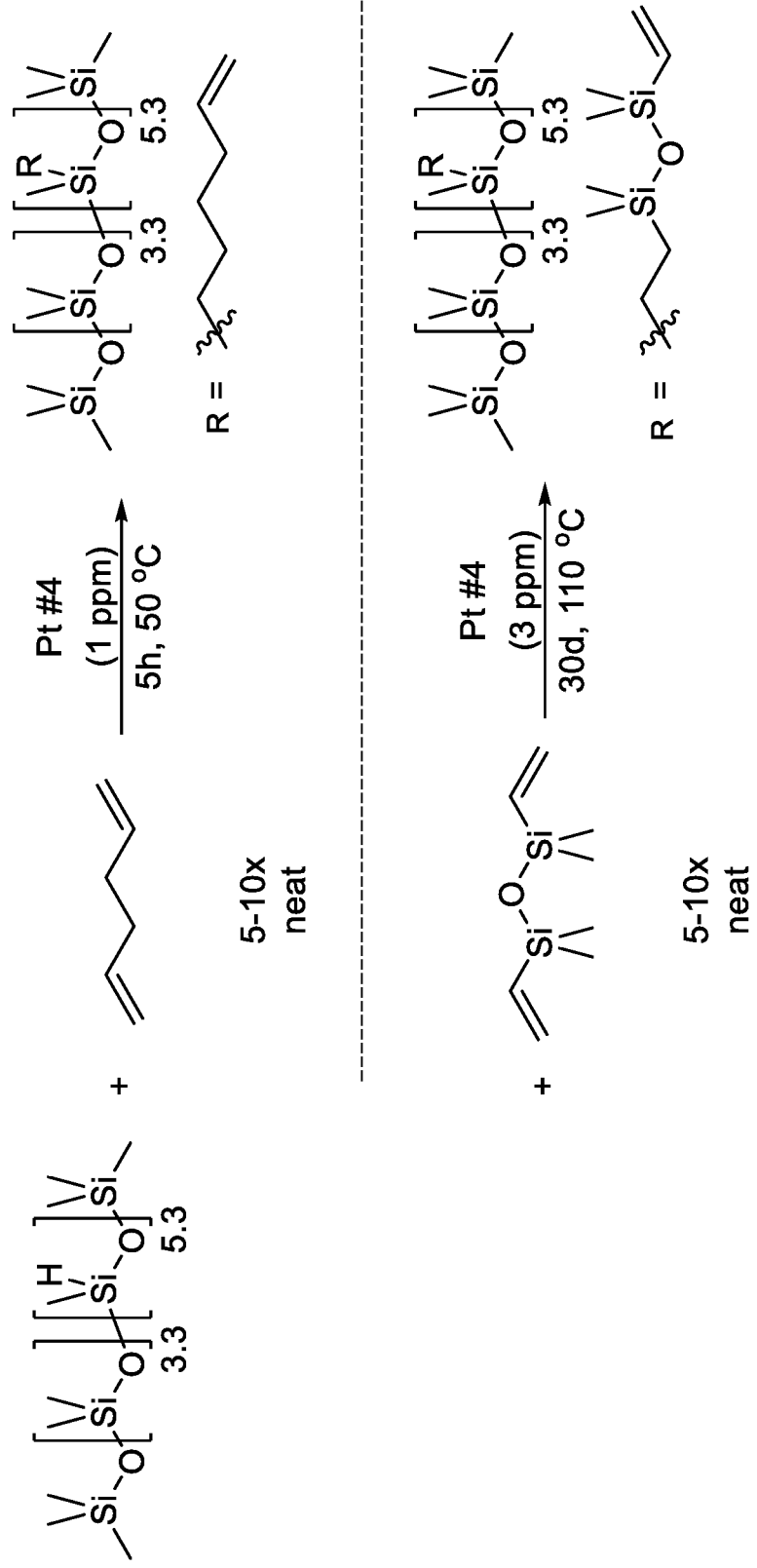
FIG. 2 illustrates synthesis of different embodiments of cross-linker C).

FIG. 1 illustrates the potential outcomes of the network formation with or without selectivity between hexenyl and vinyl silyl groups. The inventive compositions herein favor selectivity of more reactive groups over less reactive groups (i.e., vi over hex). For comparison, branched polymers component C1) No. 1 ($MD_{3.3}D^{hex}_{5.3}M$) and component C1) No. 2 ($MD_{3.3}D^{vi}_{5.3}M$) were synthesized as cross-linkers (see FIG. 2).

Figure 3:
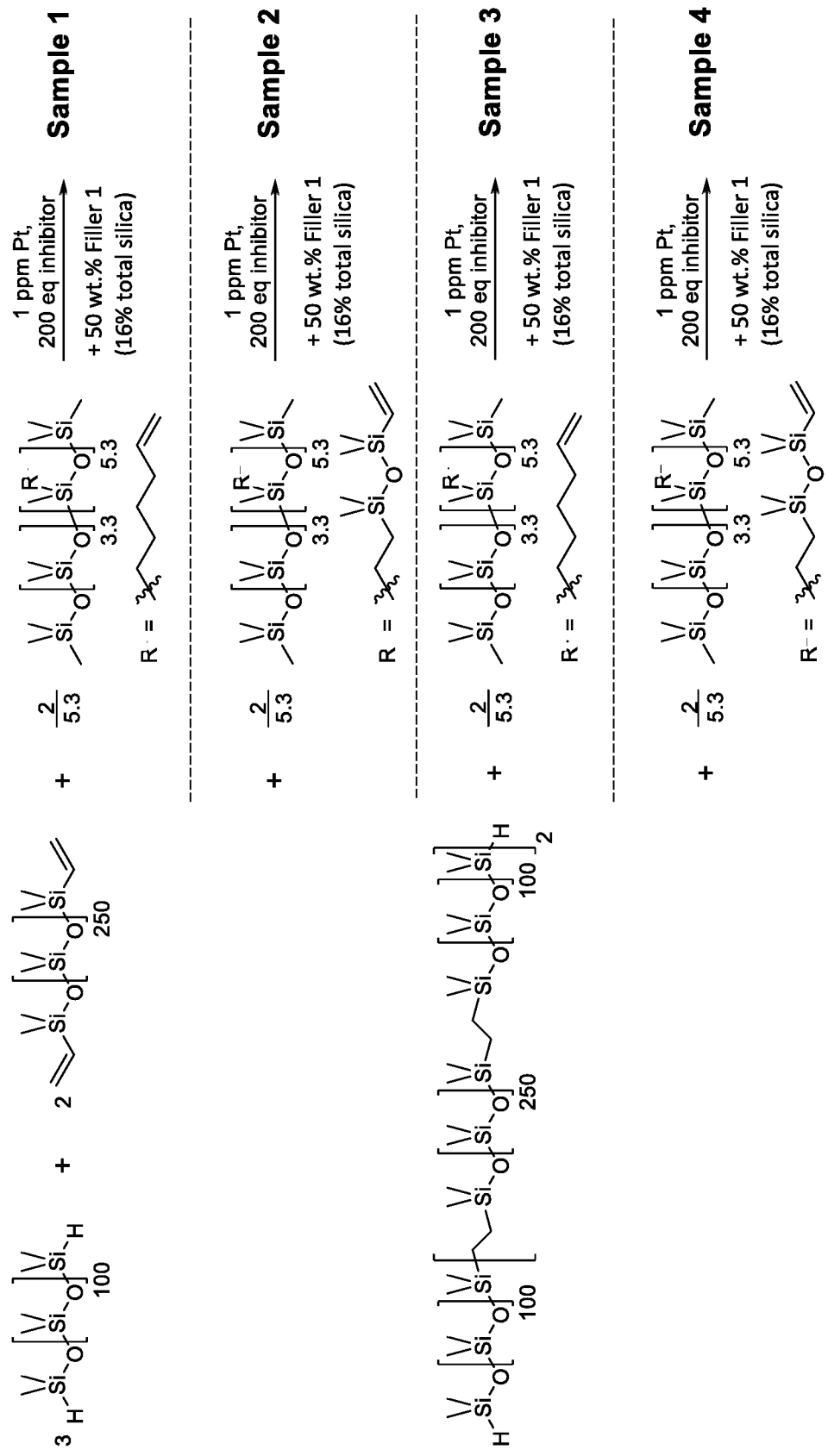
FIG. 3 illustrates four control experiments (Samples 1, 2, 3, and 4) to determine vinyl selectivity over hexenyl in a polymer system.

Chain extenders, component A) No. 1 ($M^{vi}D_{250}M^{vi}$) and component B) No. 1 ($M^HD_{100}M^H$) were mixed with 50 wt. % Filler No. 1 and either component C1) No. 1 or component C1) No. 2 and then cured to give Sample 1 and Sample 2, respectively (see FIG. 3). Furthermore, to confirm preferential reaction of vinyl functional group over hexenyl functional group, component B) No. 1 and component A) No. 1 polymers were reacted to pre-form the extended linear chain prior to curing with either component C1) No. 1 or component C1) No. 2 (Sample 3 and Sample 4, respectively). In each of these samples, stoichiometry was precisely controlled to theoretically form a complete network.

Figure 4:
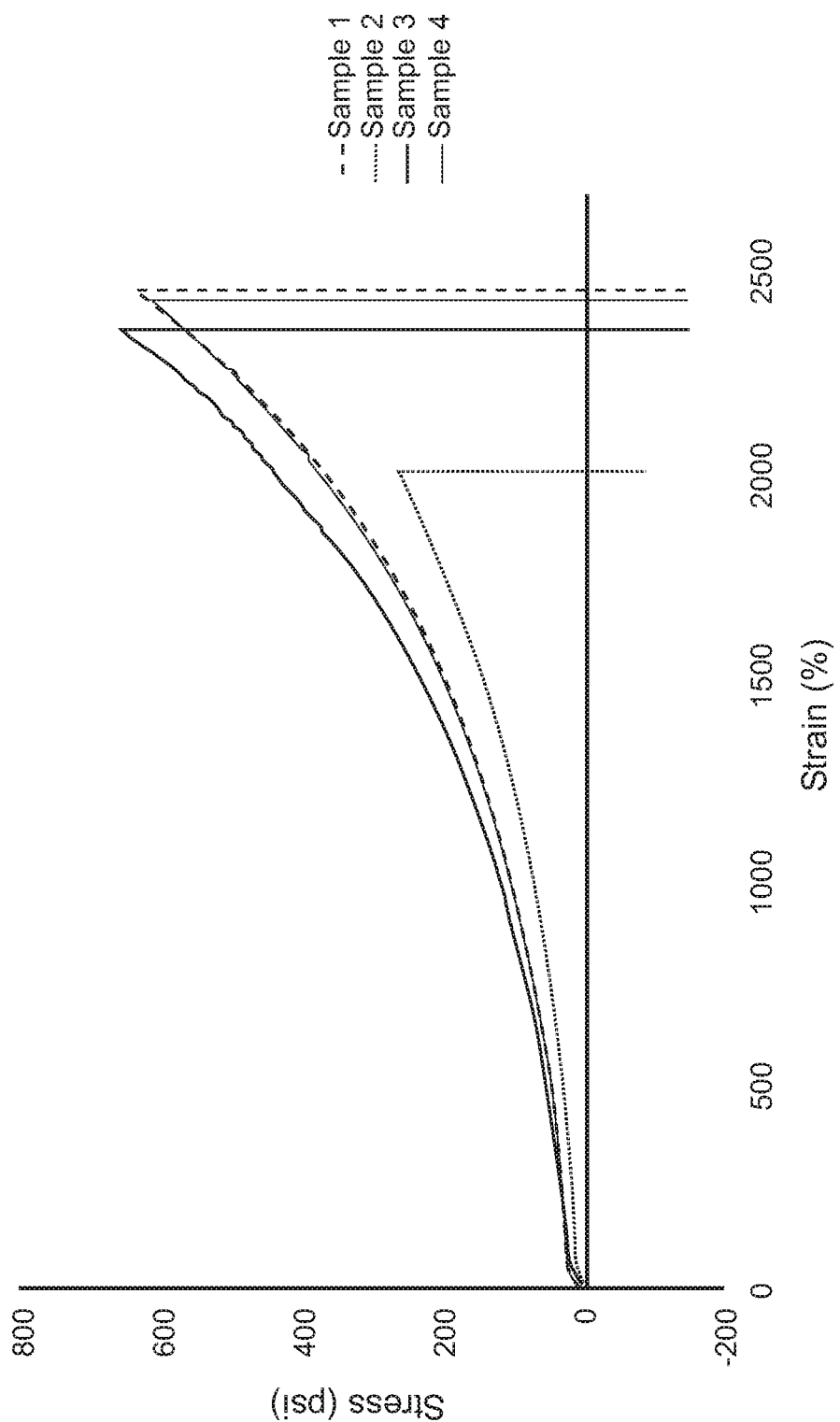
FIG. 4 illustrates a stress strain curve of Samples 1-4; showing a select run for each.

Average $M_c$ and $\rho_c$ (cross-link density) were calculated from swell gel (see calculations further below). Table 1 below shows the comparison of the four samples. Samples 1, 3, and 4 have $M_c$ and $\rho_c$ values that are reasonably close; however, approximately half the magnitude of Sample 2, which supports selective chain extension. Furthermore, results from tensile further supports selective chain extension (see FIG. 4).

TABLE 1

Physical properties compared using swell gel ($M_c$ and $\rho_c$), tensile (break stress and % elongation), and hardness data. Average of three runs for each sample.

|  | Sample 1 | Sample 2 | Sample 3 | Sample 4 |
| --- | --- | --- | --- | --- |
| % swell gel | 96 | 90 | 96 | 95 |
| Avg. MW between cross-links, $M_c$ (g/mol) | 65,556 | 125,114 | 53,130 | 63,458 |
| Avg. cross-link density, $\rho_c$ (mol/cm$^3$) | $1.48 \times 10^{-5}$ | $0.78 \times 10^{-5}$ | $1.83 \times 10^{-5}$ | $1.53 \times 10^{-5}$ |
| Break Stress, psi | 501 | 250 | 594 | 533 |
| (MPa) | (3.5) | (1.7) | (4.1) | (3.7) |
| % elongation | 2184 | 1954 | 2290 | 2249 |
| Durometer Shore A | 10.4 | 4.5 | 11.0 | 9.1 |

Figure 5:
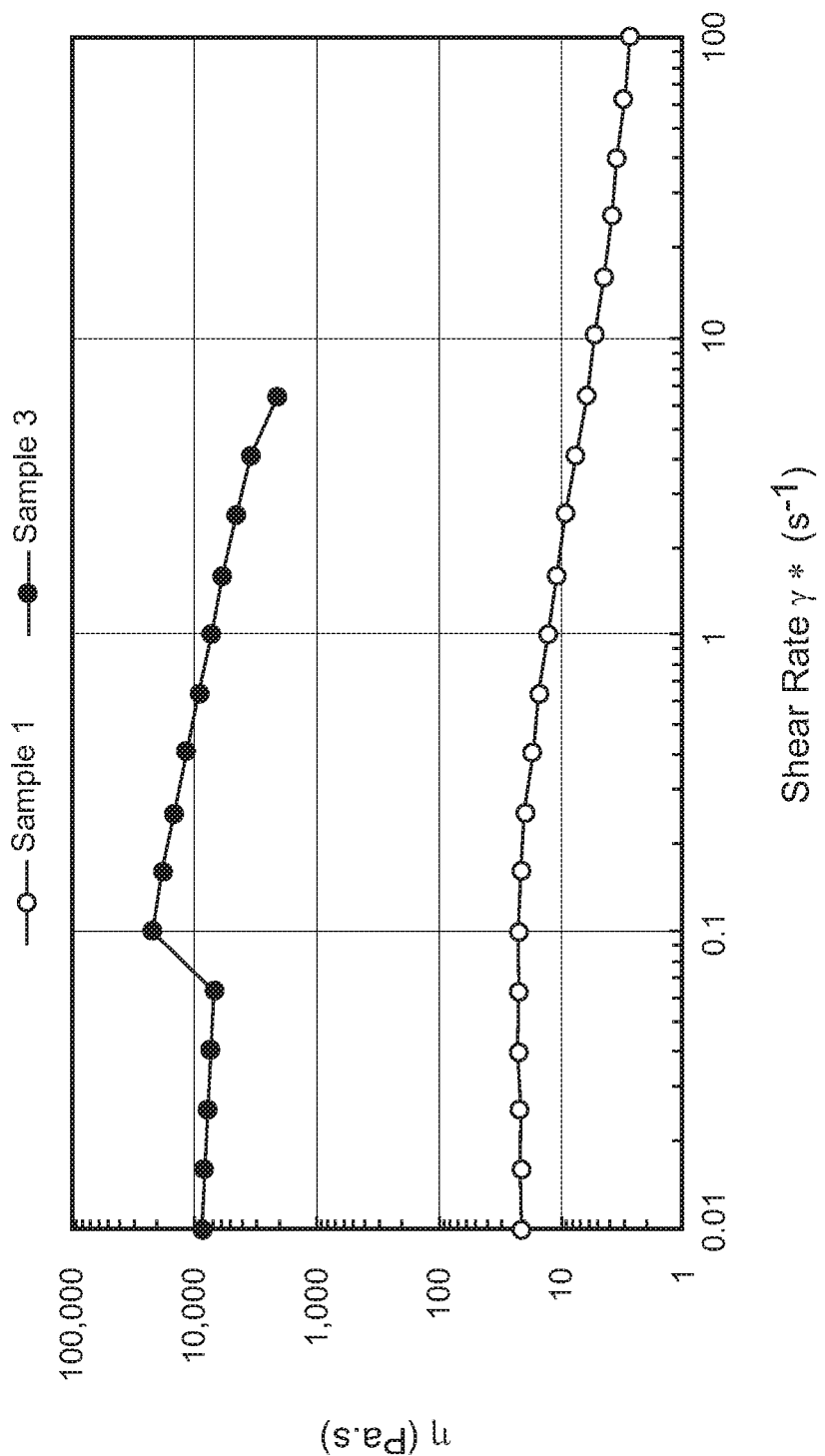
FIG. 5 illustrates a comparison of viscosities for Sample 1 and Sample 3 prior to cure.
Figure 6:
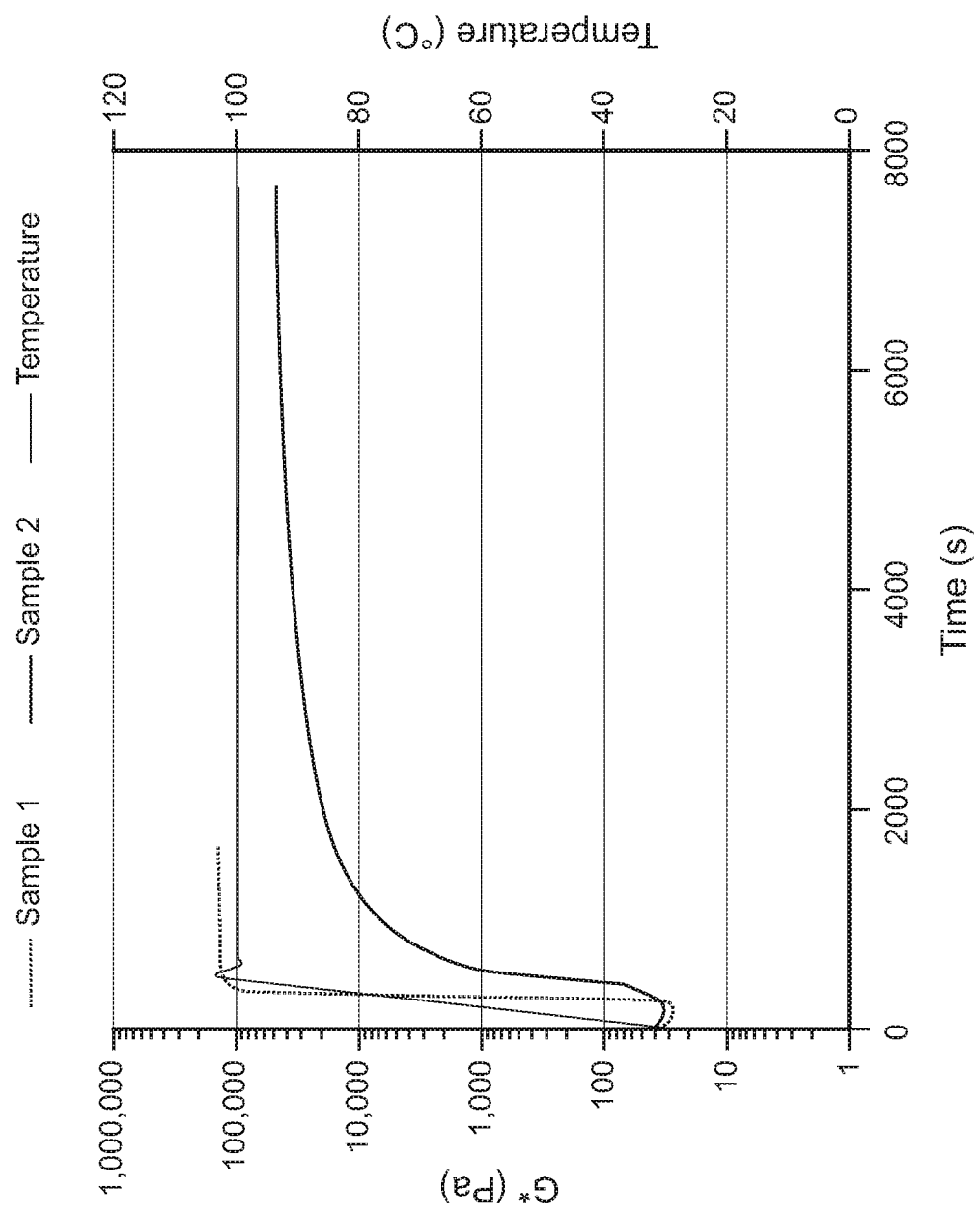
FIG. 6 illustrates a cure rheology comparison of Sample 1 and Sample 2 at 100° C. ramp (10° C./min).

Remarkably, the viscosities of Sample 1 and Sample 3 prior to cure are strikingly different (20 Pa·s and 9000 Pa·s, respectively) (see FIG. 5) but once cured, give similar mechanical properties (see Table 1). In addition, when comparing the cure rheology of Sample 1 and Sample 2 at 100° C., Sample 1 cleanly nears its final modulus in a fraction of time compared to Sample 2 (see FIG. 6).

In order to understand the effect of excess SiH for an ideal system such as in Sample 1, Samples 5 & 6 were prepared with a competing SiH cross-linker ($MD_{3.3}D^H_{5.3}M$). Sample 7 was prepared without SiH chain extender or hexenyl cross-linker as a baseline (see Table 2).

TABLE 2

Samples 1, 5, 6, and 7 formulations and observed physical properties of the respective cured materials. Physical properties were measured in triplicates.

|  |  | Sample 1 | Sample 5 | Sample 6 | Sample 7 |
|---|---|---|---|---|---|
| Polymers (wt. %) | $M^{vi}D_{250}M^{vi}$ | 55.62 | 55.42 | 54.39 | 82.33 |
|  | $M^{H}D_{100}M^{H}$ | 27.11 | 27.01 | 26.51 | 0.00 |
|  | $MD_{3.3}D^{H}{}_{5.3}M$ | 0.00 | 0.30 | 0.89 | 0.90 |
|  | $MD_{3.3}D^{hex}{}_{5.3}M$ | 0.49 | 0.49 | 1.44 | 0.00 |
|  | $M^{vi}D_{250}M^{vi}$ (from Filler No. 1) | 16.00 | 16.00 | 16.00 | 16.00 |
| Inhibitor (wt. %) | 1 wt. % 2-phenyl-3-butyn-1-ol in MM | 0.77 | 0.77 | 0.77 | 0.77 |
| Catalyst (wt. %) | 1 wt. % soln Pt in MM | 0.01 | 0.01 | 0.01 | 0.01 |
| Total (%) |  | 100 | 100 | 100 | 100 |
| Functional group ratio | SiH total/olefin | 1.00 | 1.33 | 1.20 | 1.00 |
|  | SiH/Vinyl | 1.50 | 1.50 | 1.50 | N/A |
|  | SiH/SiH cross-linker | N/A | 3.00 | 1.00 | N/A |
|  | SiH/hexenyl | 3.00 | 3.00 | 1.00 | N/A |
|  | MW between cross-links, $M_c$ (g/mol) | 56,680 | 63,033 | 35,875 | 15,752 |
|  | Cross-link density, $\rho_c$ (mol/cm$^3$) | $1.7 \times 10^{-5}$ | $1.6 \times 10^{-5}$ | $2.7 \times 10^{-5}$ | $6.2 \times 10^{-5}$ |
|  | % swell gel | 96.1 | 92.9 | 92.9 | 96.9 |
|  | Durometer (Shore A) | 11.2 | 7.1 | 9.4 | 21.0 |
|  | Break Stress (psi) | 628 | 173 | 147 | 171 |
|  | (MPa) | (4.3) | (1.2) | (1.0) | (1.2) |
|  | % elongation | 2370 | 1003 | 589 | 435 |

Filler No. 1 comprises a surface treated silica filler (~32 wt. %) dispersed in a vinyl polymer (~68 wt. %; $M^{vi}D_{250}M^{vi}$).

Figure 7:
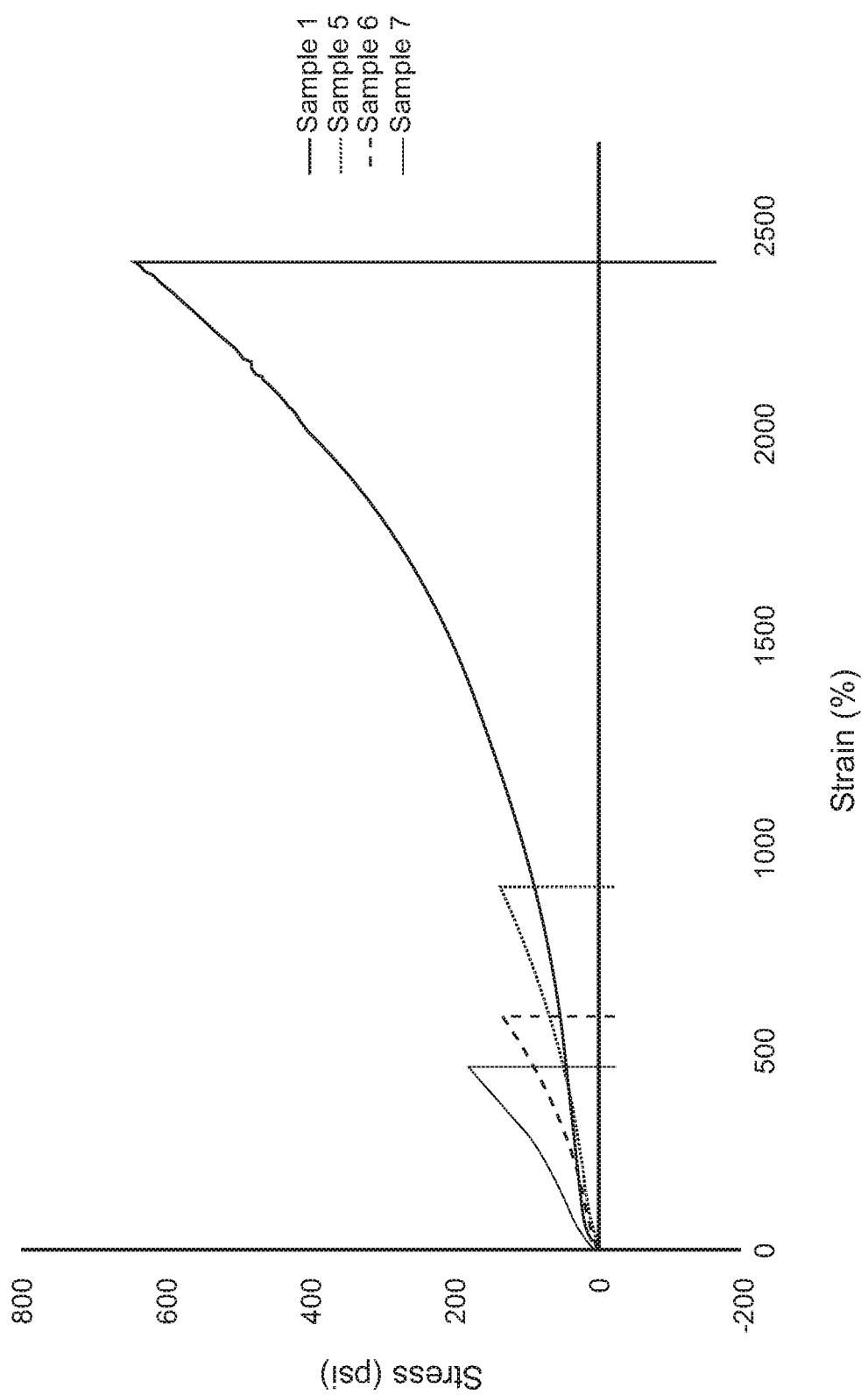
FIG. 7 illustrates a stress strain curve of Sample 1, and additional experiments (Samples 5, 6, and 7); showing a select run for each.
Figure 8:
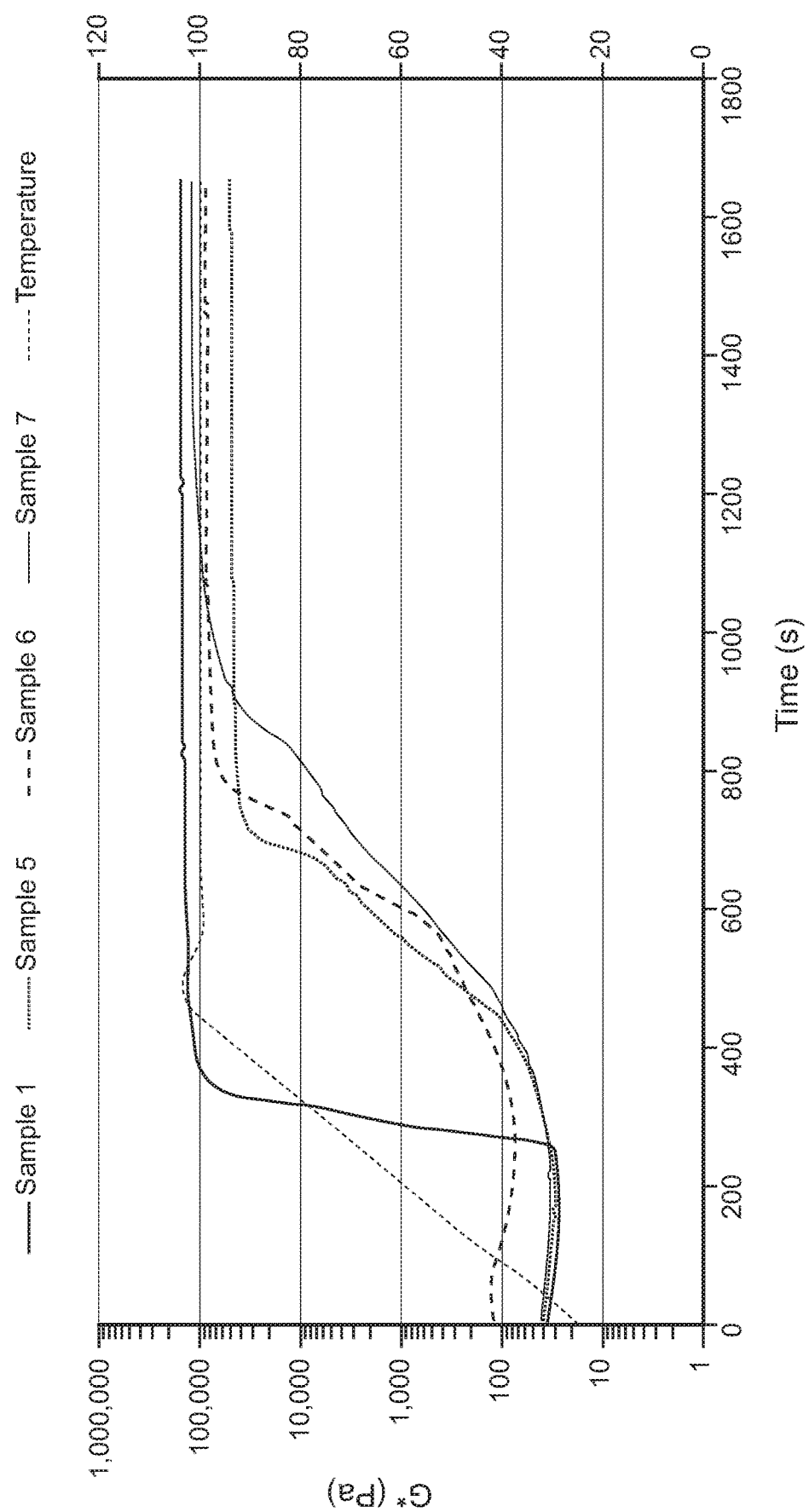
FIG. 8 illustrates a cure rheology comparison at 100° C. ramp (10° C./min).

While cross-link densities of Samples 1 and 5 were close in magnitude, break stress and % elongation were significantly lower for Sample 5. With additional SiH cross-linker that competes with terminal SiH in Samples 5 & 6, tensile strength and % elongation more closely resemble Sample 7 than Sample 1 (see FIG. 7 and FIG. 8).

General Procedure for Hydrosilylation

All glassware were dried in a 150° C. oven prior to assemble and reactions performed under N$_2$ atmosphere. To a three-neck round bottom flask was added the olefin and equipped with a condenser, a septum, a stir bar and a thermocouple. The reaction was heated to 40° C. and while stirring, a small portion of SiH polymer ($MD_{3.3}D^{H}{}_{5.3}M$) was added (~5% of intended amount) followed by the addition of Pt catalyst. The remainder of SiH polymer was added via a syringe pump at <1.000 mL/min. Less than 1° C. reaction temperature increase was observed owing to the slow addition rate. The reaction was held at a specified temperature until all SiH polymer was consumed (periodically monitored by $^1$H NMR for 4.7 ppm resonance consumption). After completion, reaction was cooled, activated carbon was added, and stirred for several minutes then filtered through a 0.2 micron syringe filter to remove the Pt catalyst. The crude mixture was stripped off of excess olefin via rotovap and used without further purification.

TABLE 3

Formation of Cross-linkers C)

|  | olefin | g olefin | g SiH | ppm Pt | time | temperature |
|---|---|---|---|---|---|---|
| $MD_{3.3}D^{hex}{}_{5.3}M$ | 1,5-hexadiene | 49.191 | 30.809 | 1 | 5 h | 50° C. |
| $MD_{3.3}D^{vi}{}_{5.3}M$ | tetramethyl divinyl disiloxane | 39.184 | 10.816 | 3 | 30 d | 110° C. |

Figure 9:
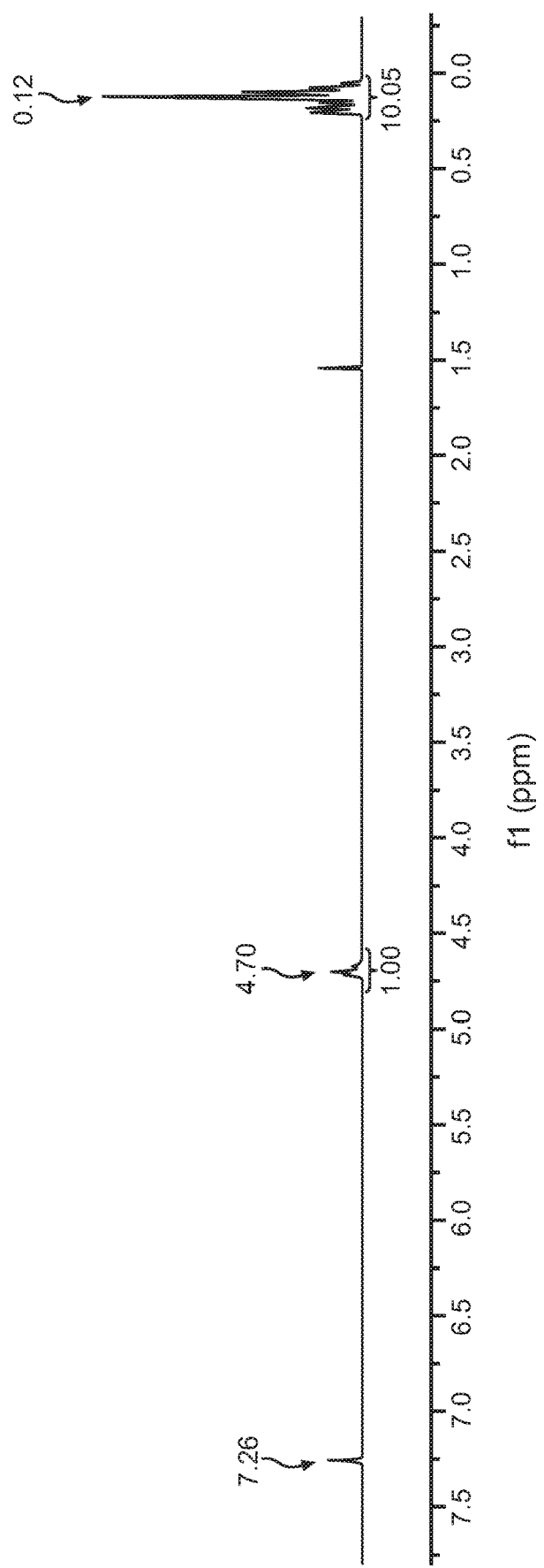
FIG. 9 illustrates a $^1$H NMR (CDCl$_3$, 400 MHz) of an embodiment of cross-linker C2) (No. 1 in Examples).
Figure 10:
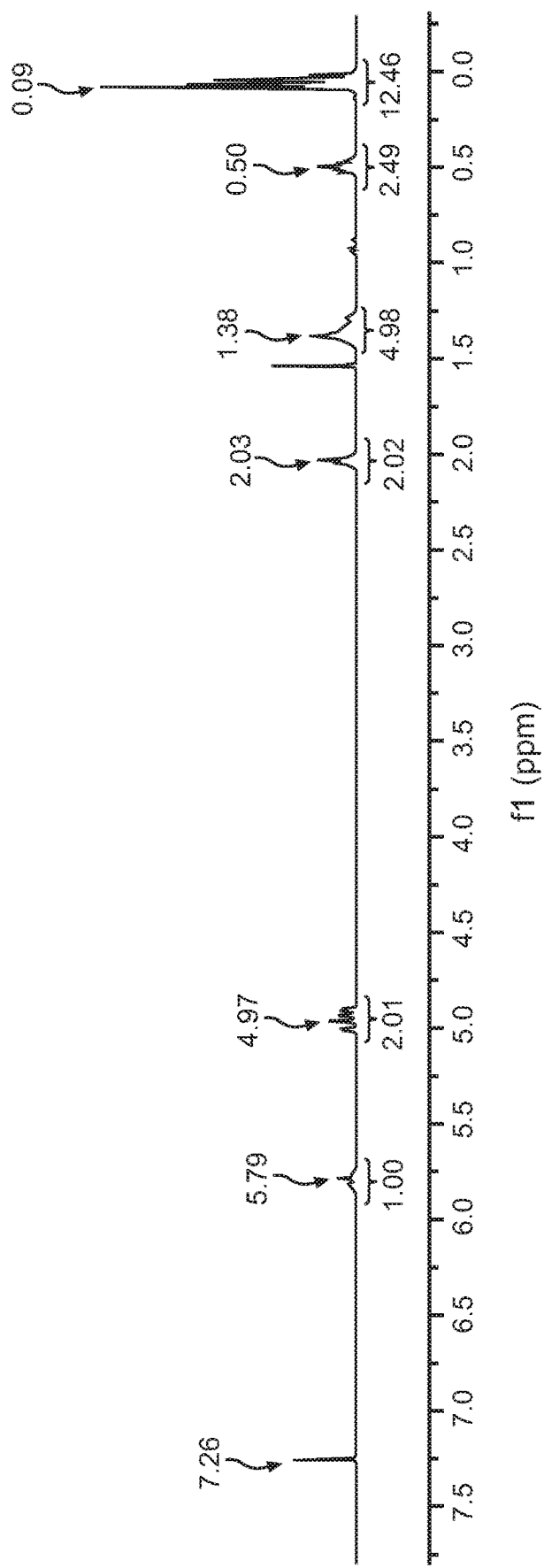
FIG. 10 illustrates a $^1$H NMR (CDCl$_3$, 400 MHz) of an embodiment of cross-linker C1) (No. 1 in Examples).
Figure 11:
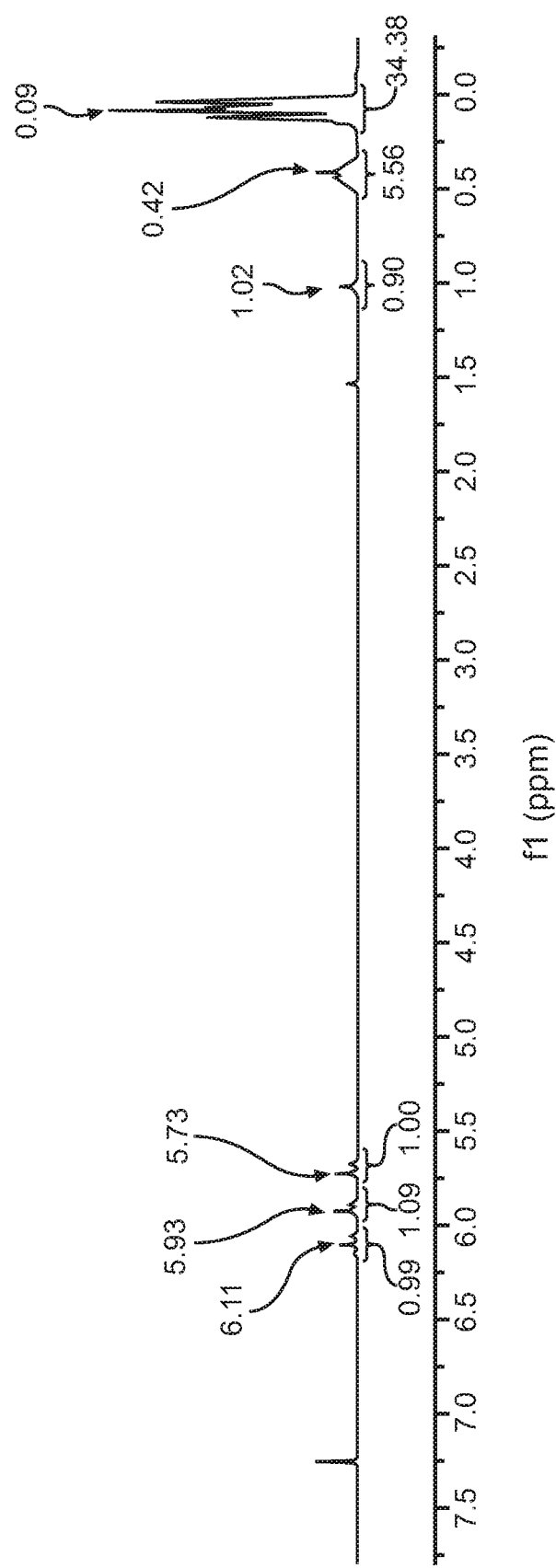
FIG. 11 illustrates a $^1$H NMR (CDCl$_3$, 400 MHz) of another embodiment of cross-linker C1) (No. 2 in Examples).

See FIG. 9 ($MD_{3.3}D^{H}{}_{5.3}M$), FIG. 10 ($MD_{3.3}D^{hex}{}_{5.3}M$), and FIG. 11 ($MD_{3.3}D^{vi}{}_{5.3}M$).

Samples 1, 2, and 5-7 General Preparation (See FIG. 3)

To a dental mixer was added polymers, fillers, and an inhibitor, then mixed using a speed mixer at 3,500 rpm for 1 minute. Finally, Pt catalyst was added then spun at 3,500 rpm for 30 seconds. The sample mix was poured onto an aluminum pan (10 cm diameter; ~15 g sample per pan) then place under vacuum to rid of air bubbles. Samples were then placed into a 100° C. oven for 24 hours for swell gel, tensile, and durometer tests.

Samples 3 and 4 General Preparation

To a dental mixer was added vinyl polymer, SiH polymer, fillers, and Pt catalyst, then mixed using a speed mixer at 3,500 rpm for 2 minutes. The sample was allowed react for 24 hours then an aliquot was taken for $^1$H NMR to ensure reaction completion. To this sample was added an inhibitor, spun at 3,500 rpm for 1 minute, added olefin cross-linkers ($MD_{3.3}D^{hex}{}_{5.3}M$ or $MD_{3.3}D^{vi}{}_{5.3}M$), then spun at 3,500 rpm for 1 minute. Same procedure as above was used to prepare samples for swell gel, tensile, and durometer.

Swell Gel

A disc (ca. 0.5 g) of cured sample was weighed into a glass jar and was allowed to swell in ca. 20 mL heptane for 24 hours. An aluminum pan was weighed and the swollen sample was carefully taken out of heptane using a pair of tweezers and weighed unto the aluminum pan. The sample was left to dry under a ventilation hood overnight. The final sample+aluminum pan weight was recorded. % swell gel, molecular weight between cross-links ($M_c$), and cross-link density ($\rho_c$) were calculated as follows.

% Swell Gel:

$$\% \text{ swell gel} = \frac{W_f}{W_0} \times 100$$

MW Between Cross-Links:

$$M_c = -\frac{V_s \rho_p \left(C^{\frac{1}{3}} - \frac{C}{2}\right)}{\ln(1-C) + C + \chi C^2}$$

$$C = \frac{W_0}{\rho_p V_\infty}$$

$$V_\infty = \frac{W_0}{\rho_p} + \frac{W_\infty - W_0}{\rho_s}$$

Cross-Link Density:

$$\rho_c = \frac{\rho_p}{M_c}$$

$W_0$=initial sample weight; $W_\infty$=swollen weight; $W_f$=final dry weight after swelling; $\rho_p$=polymer density; $\rho_s$=solvent density; C=relative concentration; $V_\infty$=final volume; $V_s$=solvent molar volume; and $\chi$=Flory-Huggins parameter Tensile Test The cured material was stamped out into a dumbbell shape using a DIN S2 die with a nominal gage length of 1 in. Tensile properties were measured using a MTS Systems Corporation (Eden Prairie, Minn.) Alliance RT/5 Workstation (S/N 212990043099) equipped with a 100-N load cell and pneumatic grips at 20.0 in/min crosshead velocity.

Durometer

Indentation hardness was measured using a Shore durometer Type A instrument. Same samples used in the tensile test were stacked to a thickness of at least 0.25 in.

Rheology

Cure modulus was measured using a TA Instrument ARES rheometer Discovery HR-3 (S/N 5333-0095). 40 mm parallel plates (disposable aluminum) were zero gapped at 25° C., sample loaded between the plates, trimmed to 1.0 mm gap, then allowed cure at a temperature ramp of 10° C./min from 25° C. to 100° C. A sweep at 1.0 Hz, 1.0% strain was conducted.

3D Printing

Example: Inkjet Printing of Silicone Composition

The ingredients in the following table were mixed to give a homogeneous mixture. 1.5 mL of the mixture was loaded using a syringe into the ink reservoir of printhead cartridge DMC-11610 from FUJIFILM Dimatix, Inc. The DMC-11610 cartridge had 16 jetting nozzles in a row, and each nozzle was designed to jet approximately 10 pL of ink per drop. It was installed onto a Dimatix material dispenser DMP-2800. The entire system was kept at room temperature.

TABLE A

Composition of Low viscosity selective hydrosilylation formulation

| | | |
|---|---|---|
| 30.99 wt.% | $M^{vi}D_9M^{vi}$ | Component A) No. 2 |
| 66.40 wt.% | $M^HD_{18}M^H$ | Component B) No. 2 |
| 2.26 wt.% | $MD_3D^{hex}{}_5M$ | Component C) No. 1 |
| 0.32 wt.% | 1 wt. % 2-phenyl-3-butyn-2-ol solution in MM | Inhibitor No. 1 |
| 0.03 wt.% | 1 wt. % Pt#4 in MM | Catalyst No. 1 |

Figure 12A:
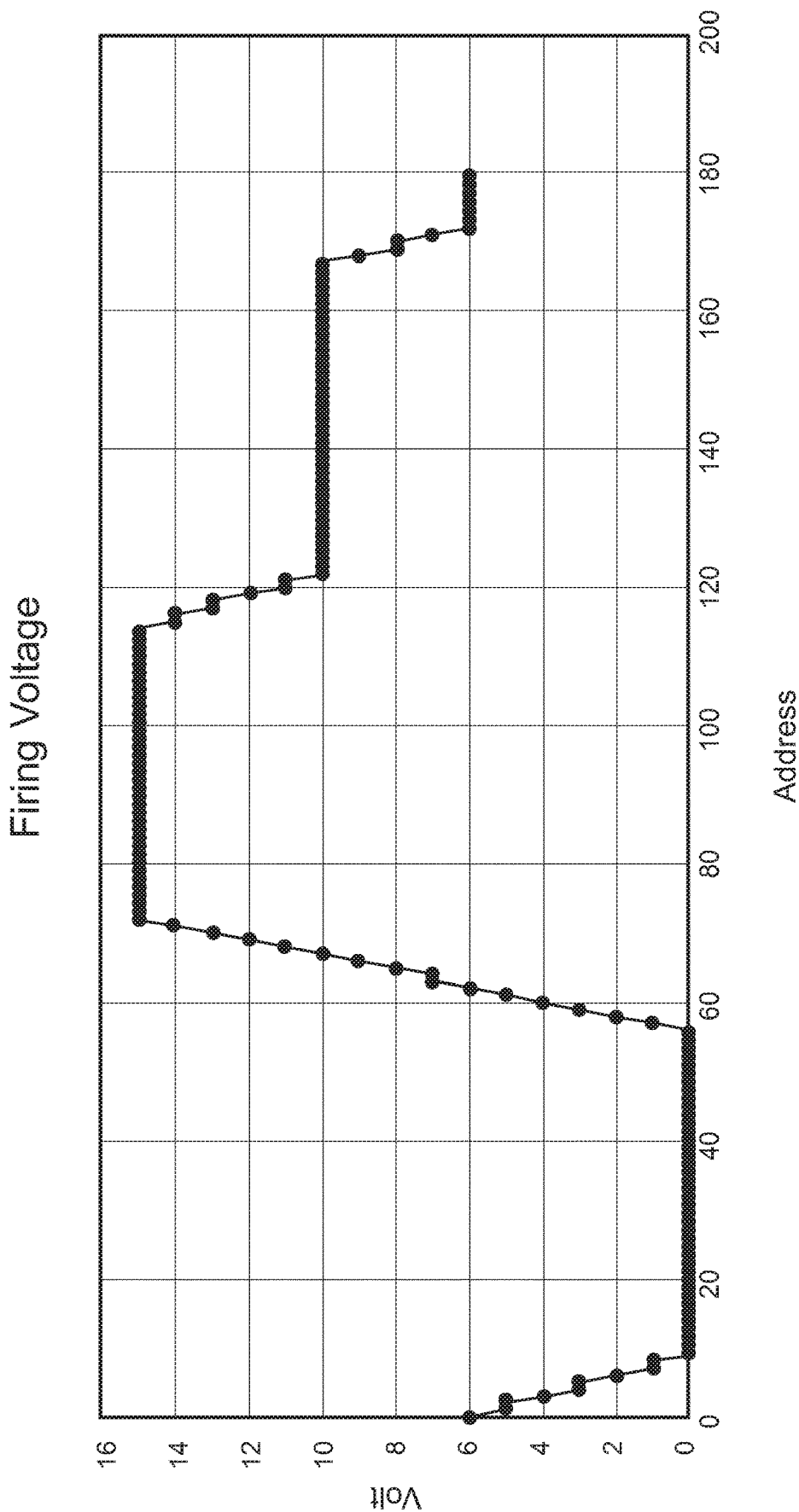
FIGS. 12a and 12b illustrate a waveform applied to jetting nozzles during each jetting cycle of a printing method.
Figure 12B:
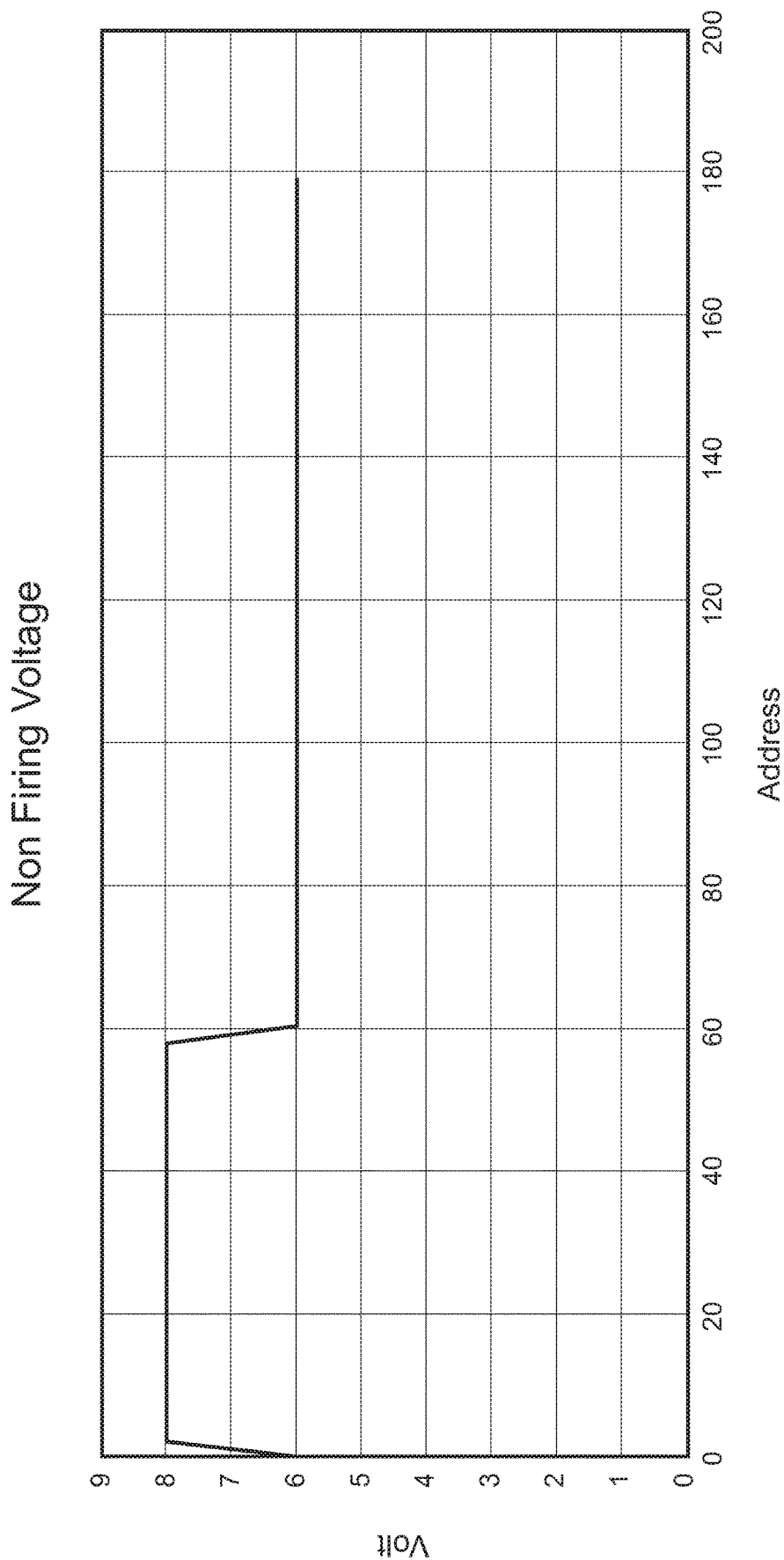

An 8.5 in×11 inch standard paper was used as the substrate to print the mixture onto. The paper was taped onto the printer platen, and the printhead nozzle height was set at 1 mm. For printing, voltages as specified by the waveform graphs in FIG. 12 were applied to each individual jetting nozzle during a jetting cycle. A model circuit pattern was printed onto the paper.

Figure 13:
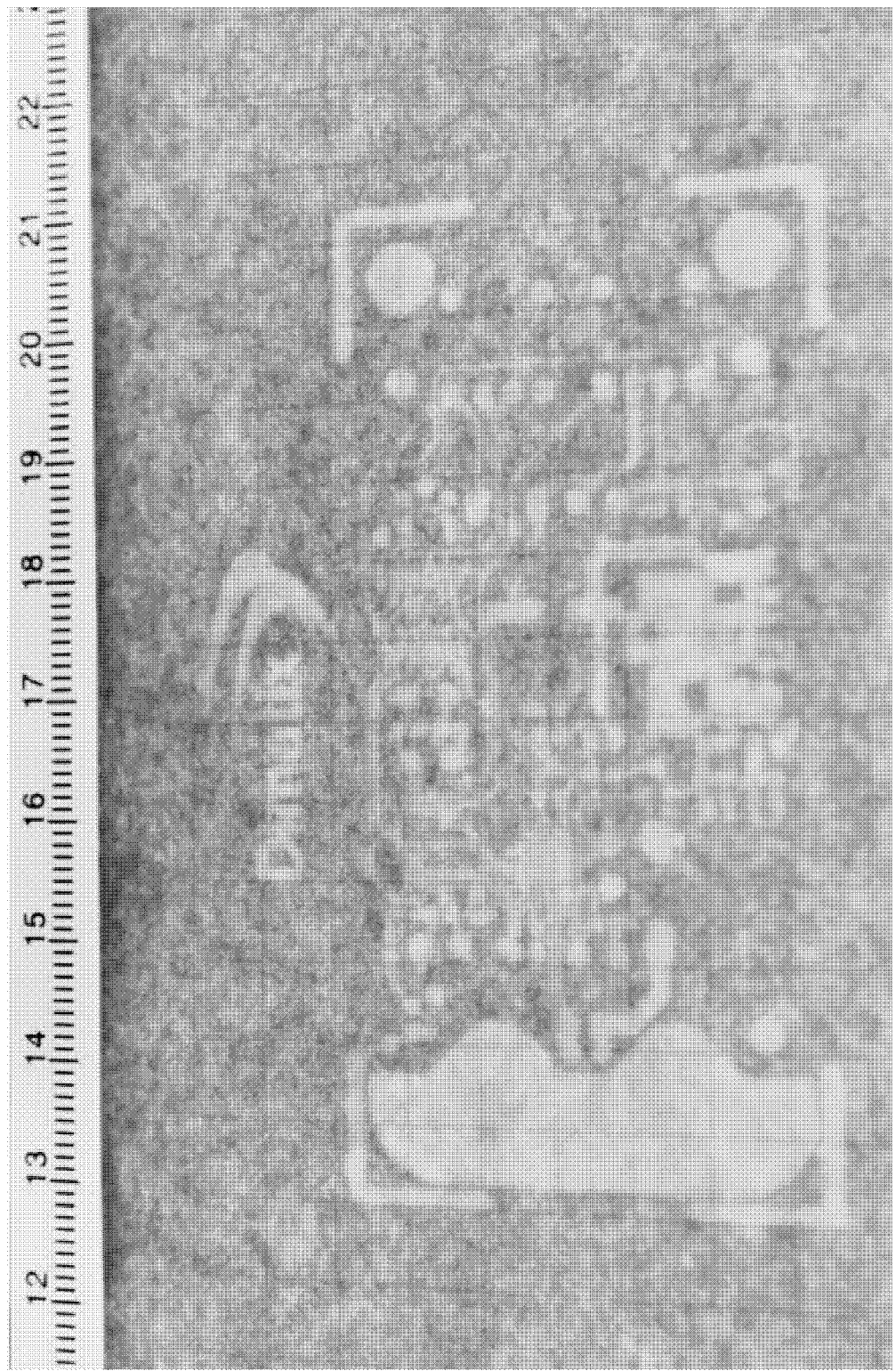
FIG. 13 is a picture of a printed pattern.

It was observed that the mixture was easily printed, although the printed pattern started to lose resolution after standing for some time without curing because of wicking of the low viscosity mixture. Curing the printed pattern at 90° C. for 10 minutes fixed the pattern. Printing was repeated five times, each time printing one layer onto a fresh paper substrate, showing good repeatability. A picture of a printed pattern is shown in FIG. 13.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A composition for forming a silicone elastomer, said composition comprising:
   A) a linear organopolysiloxane having at least two silicon-bonded ethylenically unsaturated groups per molecule;
   B) a linear organohydrogensiloxane having at least two silicon-bonded hydrogen atoms per molecule;
   at least one cross-linker C) selected from the group consisting of:
      C1) a linear organopolysiloxane having at least three silicon-bonded ethylenically unsaturated groups per molecule, and
      C2) an organopolysiloxane having at least three silicon-bonded hydrogen atoms per molecule, wherein the silicon-bonded hydrogen atoms of component C2) are pendent or both terminal and pendent; and
   D) a hydrosilylation catalyst present in a catalytically effective amount;
   wherein at least one of the silicon-bonded ethylenically unsaturated groups of component C1) has a lower reactivity relative to the silicon-bonded ethylenically unsaturated groups of component A); and
   wherein at least one of the silicon-bonded hydrogen atoms of component C2) has a lower reactivity relative to the silicon-bonded hydrogen atoms of component B);
   provided that if a molar excess of component B) is present relative to component A), then at least component C1) is present, and if a molar excess of component A) is present relative to component B), then at least component C2) is present.

2. The composition as set forth in claim 1, wherein component A) has two silicon-bonded ethylenically unsaturated groups per molecule.

3. The composition as set forth in claim 1, wherein the silicon-bonded ethylenically unsaturated groups of component A) are vinyl groups.

4. The composition as set forth in claim 1, wherein component A) is of average formula I):

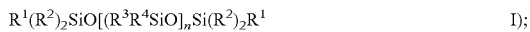

$$R^1(R^2)_2SiO[(R^3R^4SiO)]_nSi(R^2)_2R^1 \qquad \text{I});$$

where each $R^1$ is an ethylenically unsaturated group, each of $R^2$, $R^3$, and $R^4$ is an independently selected substituted or unsubstituted hydrocarbyl group, and subscript n is from 2 to 10,000.

5. The composition as set forth in claim 1, wherein component B) has two silicon-bonded hydrogen atoms per molecule.

6. The composition as set forth in claim 1, wherein component B) is of average formula II):

$$H(R^2)_2SiO[(R^3R^4SiO)]_mSi(R^2)_2H \qquad \text{II});$$

where each of $R^2$, $R^3$, and $R^4$ is an independently selected substituted or unsubstituted hydrocarbyl group, and subscript m is from 2 to 10,000.

7. The composition as set forth in claim 1, wherein component C1) is present and has at least one hexenyl group.

8. The composition as set forth in claim 1, wherein component C1) is present and the silicon-bonded ethylenically unsaturated groups of component C1) are hexenyl groups.

9. The composition as set forth in claim 1, wherein component C1) is present and of average formula III):

$$R^5(R^2)_2SiO[(R^3R^4SiO)]_p[(R^3R^6SiO)]_qSi(R^2)_2R^5 \qquad \text{III});$$

where each of $R^2$, $R^3$, and $R^4$ is an independently selected substituted or unsubstituted hydrocarbyl group, each $R^5$ is an independently selected ethylenically unsaturated group or is $R^2$, each $R^6$ is an independently selected moiety comprising an ethylenically unsaturated group, subscript p is from 1 to 500, and subscript q is from 1 to 500, provided that if each $R^5$ is $R^2$ then subscript q is from 3 to 500.

10. The composition as set forth in claim 1, wherein component C2) is present and of average formula IV):

$$R^7(R^2)_2SiO[(R^3R^4SiO)]_y[(R^3HSiO)]_zSi(R^2)_2R^7 \qquad \text{IV});$$

where each of $R^2$, $R^3$, and $R^4$ is an independently selected substituted or unsubstituted hydrocarbyl group, each $R^7$ is an independently selected hydrogen atom or is $R^2$, subscript y is from 1 to 500, and subscript z is from 1 to 500, provided that if each $R^7$ is $R^2$ then subscript z is from 3 to 500.

11. The composition as set forth in claim 1, further comprising at least additive selected from the group consisting of reaction inhibitors, terminating agents, fillers, thixotropic agents, organopolysiloxane resins, organopolysiloxanes different from component A), organohydrogensiloxanes different from component B), organopolysiloxanes different from component C), and combinations thereof.

12. The composition as set forth in claim 1, having a viscosity less than 100 Pa·s at 25° C.

13. The composition as set forth in claim 1, being thixotropic and/or shear thinning.

14. A silicone elastomer, said silicone elastomer comprising the reaction product of the composition according to claim 1.

15. A method of forming a three-dimensional (3D) article, said method comprising:
- I) printing a first silicone composition with a 3D printer to form a layer; and
- II) printing a second silicone composition on the layer with the 3D printer to form a subsequent layer;
- III) optionally, repeating step II) with independently selected silicone composition(s) for any additional layer(s) to form the 3D article;
  - wherein the first and second silicone compositions are the same as or different from one another; and
  - wherein at least one of the first and/or second silicone compositions is the composition according to claim 1.

16. The method according to claim 15, wherein the 3D printer is an ink-jetting printer.

17. A method of forming a three-dimensional (3D) article, said method comprising:
- 1) I) curing a first layer in a volume of silicone composition; and
  - II) curing a second layer in a volume of silicone composition;
  - III) optionally, repeating step II) with independently selected silicone composition(s) for any additional layer(s) to form the 3D article; or
- 2) direct formation of a cured 3D article in a volume of silicone composition by applying electromagnetic radiation; or
- 3) I) direct deposition of a silicone composition into a supporting medium to directly form a 3D article; and
  - II) curing the 3D article at room temperature or by application of heat, electromagnetic radiation, electric field and oscillation, and/or magnetic field and oscillation;
  - wherein the silicone composition is the composition according to claim 1.

18. A 3D article, said 3D article formed by the method according to claim 15.

19. A 3D article, said 3D article formed by the method according to claim 17.

* * * * *